US010914312B2

(12) United States Patent
Oda

(10) Patent No.: US 10,914,312 B2
(45) Date of Patent: Feb. 9, 2021

(54) FAN

(71) Applicant: KAO CORPORATION, Tokyo (JP)

(72) Inventor: Yoshiro Oda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 137 days.

(21) Appl. No.: 16/083,940

(22) PCT Filed: Apr. 20, 2017

(86) PCT No.: PCT/JP2017/015910
§ 371 (c)(1),
(2) Date: Sep. 11, 2018

(87) PCT Pub. No.: WO2017/188122
PCT Pub. Date: Nov. 2, 2017

(65) Prior Publication Data
US 2019/0390682 A1 Dec. 26, 2019

(30) Foreign Application Priority Data

Apr. 27, 2016 (JP) .................................. 2016-089422

(51) Int. Cl.
| | |
|---|---|
| C08L 77/06 | (2006.01) |
| F04D 29/02 | (2006.01) |
| F04D 29/66 | (2006.01) |
| B29B 7/90 | (2006.01) |
| B29C 45/00 | (2006.01) |
| C08K 3/30 | (2006.01) |
| C08K 3/34 | (2006.01) |
| C08K 5/105 | (2006.01) |
| C08K 5/435 | (2006.01) |
| C08K 7/00 | (2006.01) |
| C08K 7/14 | (2006.01) |
| B29K 77/00 | (2006.01) |
| B29K 509/02 | (2006.01) |
| B29K 509/08 | (2006.01) |

(52) U.S. Cl.
CPC .............. *F04D 29/023* (2013.01); *B29B 7/90* (2013.01); *B29C 45/0001* (2013.01); *C08K 3/30* (2013.01); *C08K 3/34* (2013.01); *C08K 5/105* (2013.01); *C08K 5/435* (2013.01); *C08K 7/00* (2013.01); *C08K 7/14* (2013.01); *F04D 29/668* (2013.01); *B29K 2077/00* (2013.01); *B29K 2509/02* (2013.01); *B29K 2509/08* (2013.01); *C08K 2003/3045* (2013.01); *C08L 77/06* (2013.01)

(58) Field of Classification Search
CPC ........... C08L 77/06; C08L 77/02; C08K 3/34; C08K 7/14
See application file for complete search history.

(56) References Cited

U.S. PATENT DOCUMENTS

| | | | |
|---|---|---|---|
| 6,245,419 B1 | 6/2001 | Hakotani et al. | |
| 10,465,063 B2* | 11/2019 | Oda | ........................ C08L 77/02 |
| 2002/0128371 A1 | 9/2002 | Poppe et al. | |
| 2003/0218863 A1 | 11/2003 | Hutchinson et al. | |
| 2005/0187322 A1* | 8/2005 | Park | ...................... B29C 44/348 524/284 |
| 2008/0026245 A1* | 1/2008 | Saga | ...................... B32B 15/08 428/626 |
| 2008/0132631 A1 | 6/2008 | Natarajan et al. | |
| 2009/0280311 A1 | 11/2009 | Kumazawa et al. | |
| 2013/0253143 A1 | 9/2013 | Takeda et al. | |
| 2013/0331500 A1 | 12/2013 | Yokoe et al. | |
| 2014/0312542 A1 | 10/2014 | Takata et al. | |
| 2015/0018468 A1 | 1/2015 | Sawada et al. | |
| 2016/0304712 A1 | 10/2016 | Yamamoto et al. | |
| 2017/0247527 A1 | 8/2017 | Oda et al. | |
| 2017/0313856 A1 | 11/2017 | Oda et al. | |

FOREIGN PATENT DOCUMENTS

| | | | | |
|---|---|---|---|---|
| CN | 101089047 A | | 12/2007 | |
| CN | 102690512 A | * | 9/2012 | .............. C08L 77/02 |
| JP | 56-159158 A | | 12/1981 | |
| JP | 57-168940 A | * | 10/1982 | .............. C08L 77/00 |
| JP | 58-120665 A | * | 7/1983 | .............. C08L 77/00 |
| JP | 59-124843 A | | 7/1984 | |
| JP | 63-183957 A | * | 7/1988 | .............. C08L 77/00 |
| JP | 63-236633 A | | 10/1988 | |

(Continued)

OTHER PUBLICATIONS

English translation of the International Search Report (form PCT/ISA/210), dated Jun. 20, 2017, for International Application No. PCT/JP2017/015910.
English translation of the International Search Report (form PCT/ISA/210), dated May 30, 2017, for International Application No. PCT/JP2017/010773.
Partial Chinese Office Action and Search Report for Chinese Application No. 201780017506.5, dated Dec. 24, 2019.
Extended European Search Report, dated Dec. 20, 2019, for European Application No. 17789405.2.

(Continued)

*Primary Examiner* — Rip A Lee
(74) *Attorney, Agent, or Firm* — Birch, Stewart, Kolasch & Birch, LLP

(57) ABSTRACT

A fan comprising a polyamide resin composition containing a polyamide resin, a plasticizer in an amount of 7 parts by mass or more and 35 parts by mass or less, and one or more components selected from the group consisting of plate-like fillers and acicular fillers in an amount of 15 parts by mass or more and 80 parts by mass or less, based on 100 parts by mass of the polyamide resin. The fan of the present invention can be suitably used in, for example, manufactured articles, such as audio equipment such as speakers, television, radio cassette recorders, headphones, audio components, or microphones, electric appliances, transportation vehicles, construction buildings, and industrial equipment, or parts thereof.

19 Claims, 4 Drawing Sheets

(56) References Cited

FOREIGN PATENT DOCUMENTS

| | | | | |
|---|---|---|---|---|
| JP | 63-304502 A | * | 12/1988 | .............. C08L 77/00 |
| JP | 3-263457 A | | 11/1991 | |
| JP | 4-89863 A | * | 3/1992 | .............. C08L 77/00 |
| JP | 5-194841 A | | 8/1993 | |
| JP | 7-82475 A | | 3/1995 | |
| JP | 7-207152 A | | 8/1995 | |
| JP | 9-184497 A | | 7/1997 | |
| JP | 10-245449 A | | 9/1998 | |
| JP | 11-119781 A | | 4/1999 | |
| JP | 2001-131407 A | | 5/2001 | |
| JP | 2001-220501 A | | 8/2001 | |
| JP | 2002-212417 A | * | 7/2002 | .............. C08L 77/00 |
| JP | 2002-212417 A | | 7/2002 | |
| JP | 2004-204104 A | | 7/2004 | |
| JP | 2004-204104 A | * | 7/2004 | .............. C08K 5/00 |
| JP | 2005-187747 A | | 7/2005 | |
| JP | 2005-194532 A | | 7/2005 | |
| JP | 2006-22238 A | | 1/2006 | |
| JP | 2007-9143 A | | 1/2007 | |
| JP | 2007-204665 A | | 8/2007 | |
| JP | 2007-238917 A | | 9/2007 | |
| JP | 2008-7753 A | | 1/2008 | |
| JP | 2008-31359 A | | 2/2008 | |
| JP | 2008-94924 A | | 4/2008 | |
| JP | 2008-156616 A | | 7/2008 | |
| JP | 2016-56261 A | | 4/2016 | |
| JP | 2016-89148 A | | 5/2016 | |
| JP | 2016-89149 A | | 5/2016 | |
| JP | 2017-172586 A | | 9/2017 | |
| JP | 2017-201172 A | | 11/2017 | |
| WO | WO 2010/084845 A1 | | 7/2010 | |
| WO | WO 2013/125359 A1 | | 8/2013 | |
| WO | WO 2014/168169 A1 | | 10/2014 | |

OTHER PUBLICATIONS

Kuraray, "Kuraray's Thermoplastic Elastomer Products Septon™ and Hybrar™," Product Information Sheet, Sep. 2016, 8 pages.

European Patent Office Communication and extended search report issued in the European Patent Application No. 17766813.4 dated Oct. 1, 2019.

* cited by examiner

FAN

FIELD OF THE INVENTION

The present invention relates to a fan. More specifically, the present invention relates to a fan usable in audio equipment, electric appliances, transportation vehicles, construction buildings, industrial equipment, and the like.

BACKGROUND OF THE INVENTION

In the recent years, countermeasures for vibrations of various equipment have been required, and especially, the countermeasures are in demand in fields such as automobiles, household electric appliances, and precision instruments. In general, materials having high vibration-damping property include materials in which a metal plate and a vibration-absorbing material such as a rubber or asphalt are pasted together, or composite materials such as vibration-damping steel plates in which a vibration-absorbing material is sandwiched with metal plates. These vibration-damping materials retain the form of high-rigidity metal plate while absorbing vibrations with a vibration-absorbing material. In addition, vibration-damping materials include alloy materials in which kinetic energy is converted to thermal energy utilizing twinning or ferromagnetization to absorb vibrations even when only metals alone are used. However, there are some disadvantages that the composite materials have limitations in molding processability because different materials are pasted together, and that a manufactured product itself becomes heavy because a metal steel plate is used. In addition, the alloy materials are also heavy because of use of metals alone, and further have been insufficient in vibration-damping property.

In addition, a fan is a member usable as a structure member for various manufactured articles. Although conventionally used fan blades accomplish high strength and high elastic modulus durable for use, there are some serious problems in mainly keeping quietness. In the use of ventilation cooling fan of the recent years, the quietness has been even more demanding due to an increase in the amount of heat generation of the circuit accompanying high performance of the processing ability of the apparatus, and due to a high-speed rotation accompanying miniaturization. However, these materials themselves do not sufficiently have the functions of damping vibration noises generated by fan blades, so that it has been tried to reduce vibration noises of fans.

So far, an invention of a fan of which shape is changed to reduce vibration noises has been made (see, Patent Publication 1). In this invention, it has been difficult to realize a high ventilation efficiency while damping vibrations generated by a fan.

In addition, an invention of a phase control circuit in which a phase of a compressional wave generated by a fan is detected, and a signal canceling this phase that is separately produced is actively controlled has been reported (see, Patent Publication 2). In this method, since a phase controlling device other than a fan would be necessary, there still remain some disadvantages in the aspect of costs and the aspect that a power source for an active control circuit would be necessary.

For this reason, vibration-damping materials to be attached to a fan have been studied for controlling noises and vibrations of a fan. For example, a method of bonding a sheet having vibration-damping property on a surface of a fan has been disclosed (see, Patent Publications 3 and 4). However, there have been some disadvantages in stability upon use for a long period of time such that a vibration-damping sheet is removed from a fan by an impact during rotations of a fan. In addition, a method including applying a paint having a vibration-damping effect to a surface of a fan to form a vibration-damping film has been reported (see, Patent Publication 5). In this case, in order to realize a high vibration-damping effect, a paint having a vibration-damping effect must be applied thickly, but there are some disadvantages that the thicker the paint, the more easily the paint is removed from a surface of a fan.

On the other hand, as a means of reducing vibration noises by providing a vibration-damping property to the constituting material of the fan itself, Patent Publication 6 describes an invention of a quiet fan comprising a vibration-damping resin composition in which an active component for increasing a dipole moment is blended with a polyamide-based polymer alloy. In this case, since a fan is a mixture of a resin and a rubber, its flowability is high and elastic modulus is low. Conversely, when the elastic modulus is increased to an extent that is durable for use as fan blades, there are some defects that the vibration-damping performance is lowered. Even in the quiet fan described in Patent Publication 6, as a result of securing the elastic modulus needed as fan blades, the vibration-damping effects are not sufficient, and even in the most favorable results found in Examples, the reduction of noise level is as much as −0.9 dB(A), which is found to have a vibration-damping effect of slightly less than 10% in terms of sound pressure.

Patent Publication 1: Japanese Patent Laid-Open No. Hei-9-184497
Patent Publication 2: Japanese Patent Laid-Open No. Hei-11-119781
Patent Publication 3: Japanese Patent Laid-Open No. Sho-63-236633
Patent Publication 4: Japanese Patent Laid-Open No. Sho-59-124843
Patent Publication 5: Japanese Patent Laid-Open No. Sho-56-159158
Patent Publication 6: Japanese Patent Laid-Open No. 2002-212417

SUMMARY OF THE INVENTION

The present invention relates to the following [1] to [4]:
[1] A fan containing a polyamide resin composition containing:
a polyamide resin,
a plasticizer in an amount of 7 parts by mass or more and 35 parts by mass or less, and
one or more components selected from the group consisting of plate-like fillers and acicular fillers in an amount of 15 parts by mass or more and 80 parts by mass or less, based on 100 parts by mass of the polyamide resin.
[2] A method for reducing vibration noises characterized by the use of a fan as defined in the above [1].
[3] Use of a fan as defined in the above [1] as a vibration-damping material.
[4] A method for producing a part or housing comprising a fan, including the steps of:
step (1): melt-kneading a polyamide resin composition containing a polyamide resin, a plasticizer in an amount of 7 parts by mass or more and 35 parts by mass or less, and one or more components selected from the group consisting of plate-like fillers and acicular fillers in an amount of 15 parts by mass or more and 80 parts by mass or less, based on 100 parts by mass of the polyamide resin, to provide a melt-kneaded product of a polyamide resin composition; and step (2): injection-molding the melt-kneaded product of a polyamide resin composition obtained in the step (1) in a mold.

DETAILED DESCRIPTION OF THE INVENTION

Figure 1:
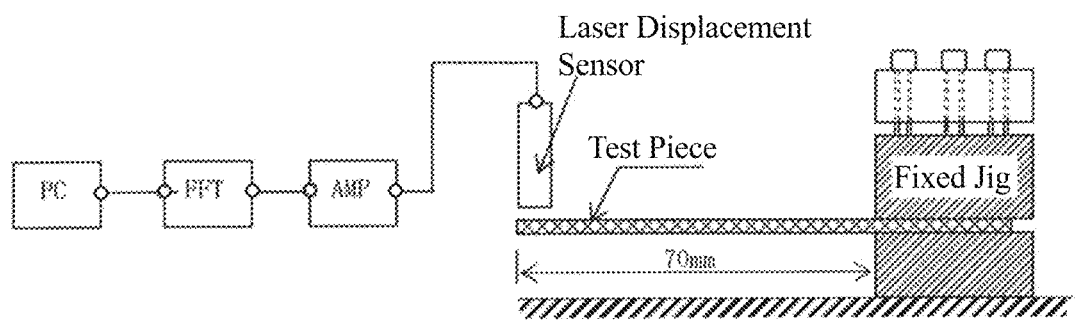
FIG. 1 is a view showing a jig used in the measurement of loss factor.

The present invention relates to a fan that has excellent vibration-damping property, excellent impact resistance, and excellent temperature dependence, even while having a high flexural modulus.

Since the fan of the present invention has a short vibration time even while having a high flexural modulus as a structural member, in the manufacture product equipment, apparatus or structured article that generates vibrations or noises, even when a fan is placed in the surroundings of the sources of vibrations or noises, the generated vibrations are damped and consequently excellent effects are exhibited that extraneous vibrations pertaining to properties of manufactured products or apparatus or unpleasant vibrations, or vibrating sounds or noises are reduced.

Also, vibrations that are generated upon applying vibrations to a fan itself are damped, and by those effects extraneous or unpleasant vibration sounds or noises upon rotating a fan can be reduced.

Furthermore, when a fan is rotated, rotation noises such as rotational vibration noises and interference noises in the frequency calculated from the rotational speed or the number of blades of a fan become larger. When this frequency overlaps with a resonance frequency of a molded article, vibration sounds and noises are considered to be even larger. However, the vibrations and noises can be reduced by using a fan of the present invention.

Moreover, the effects as mentioned above are sufficiently excellent in temperature dependency not only in the room temperature region but also in a low-temperature region and a high-temperature region.

The fan of the present invention is constituted by a polyamide resin composition containing:
a polyamide resin,
a plasticizer in an amount of 7 parts by mass or more and 35 parts by mass or less, and
one or more components selected from the group consisting of plate-like fillers and acicular fillers in an amount of 15 parts by mass or more and 80 parts by mass or less,
based on 100 parts by mass of the polyamide resin. The fan constituted by the above resin composition as used herein may be also described as the fan of the present invention.

Generally, when an inorganic filler is added to a resin, elastic modulus of an overall resin composition is improved, while a loss factor is lowered. The lowering of this loss factor is due to a decrease in the amount of energy loss in a resin moiety because a proportion of a resin in the resin composition is reduced by addition of a filler. However, in the present invention, by using a plate-like filler or an acicular filler as a filler, these fillers are oriented in the direction of flow, so that interfaces that influences frictions that are generated upon vibrations of molded articles are present in large amounts, and thereby frictions are generated at the interfaces, as compared to fillers with other shapes, whereby energy loss is more likely to take place, and the lowering of loss factor is suppressed. Moreover, since a plasticizer is copresent in the system described above, it is assumed that the overall system can be provided with flexibility, so that energy loss even more takes place, and that the lowering of loss factor can be even more suppressed. Here, the present invention is not intended to be limited by these assumptions.

The polyamide resin composition constituting a fan of the present invention will be explained hereinbelow.

[Polyamide Resin Composition]

[Polyamide Resin]

The polyamide resin in the present invention is not particularly limited as long as the polyamide resin is a known polyamide resin, and is preferably one of the following (1) to (3):

(1) a copolymer of a polycondensate of a diamine and a dicarboxylic acid;

(2) a polymer of a polycondensate of a lactam or an aminocarboxylic acid; and (3) a polymer containing two or more members selected from the group consisting of (1) and (2).

As the diamine, an aliphatic diamine, an aromatic diamine, or a diamine having a ring structure can be used. Specific examples include tetramethylenediamine, hexamethylenediamine, octamethylenediamine, nonamethylenediamine, undecamethylenediamine, dodecamethylenediamine, and metaxylylenediamine. These can be used alone or in a combination of two or more kinds. Among them, hexamethylenediamine is preferred from the viewpoint of improving vibration-damping property.

As the dicarboxylic acid, an aliphatic dicarboxylic acid, an aromatic dicarboxylic acid, or a dicarboxylic acid having a ring structure can be used. Specific examples include adipic acid, heptanedicarboxylic acid, octanedicarboxylic acid, nonanedicarboxylic acid, undecanedicarboxylic acid, dodecanedicarboxylic acid, terephthalic acid, and isophthalic acid. These can be used alone or in a combination of two or more kinds. Among them, adipic acid is preferred from the viewpoint of improving vibration-damping property.

As the lactam, a lactam having from 6 to 12 carbon atoms can be used. Specific examples include ε-caprolactam, enanthlactam, undecanelactam, dodecanelactam, α-pyrrolidone, and α-piperidone. These can be used alone or in combination of two or more kinds. Among them, ε-caprolactam, undecanelactam, and dodecanelactam are preferred from the viewpoint of improving vibration-damping property.

As the aminocarboxylic acid, an aminocarboxylic acid having from 6 to 12 carbon atoms can be used. Specific examples include 6-aminocaproic acid, 7-aminoheptanoic acid, 9-aminononanoic acid, 11-aminoundecanoic acid, and 12-aminododecanoic acid. Among them, 6-aminocaproic acid, 11-aminoundecanoic acid, and 12-aminododecanoic acid are preferred from the viewpoint of improving vibration-damping property. These can be used alone or in combination of two or more kinds.

The polycondensation of the above diamine and the above dicarboxylic acid, and the polycondensation of the lactam or the aminocarboxylic acid can be carried out in accordance with a known method, without being particularly limited thereto. In the present invention, commercially available products of these compounds can be suitably used.

The polyamide resin in the present invention has a glass transition temperature (Tg) of preferably 20° C. or higher, more preferably 25° C. or higher, even more preferably 30° C. or higher, and still even more preferably 35° C. or higher, from the viewpoint of giving rigidity capable of supporting its own shape and improving mold processability, and from the viewpoint of improving heat resistance. Also, the polyamide resin has a glass transition temperature of preferably 160° C. or lower, more preferably 150° C. or lower, even more preferably 140° C. or lower, and still even more preferably 130° C. or lower, from the viewpoint of improving vibration-damping property. Here, the glass transition temperatures of the resins and the elastomers as used herein can be measured in accordance with a method described in Examples set forth below.

In addition, it is preferable that a polyamide resin in the present invention has crystallinity. Generally, since there are some differences in elastic moduli between the crystalline portions and the amorphous portions of the resin, a resin matrix comprising only an amorphous portion or a crystalline portion has smaller energy loss without causing large strains to vibrations because of its homogenous structure. On the other hand, in a resin matrix comprising a mixture of crystalline portions and amorphous portions, inhomogeneous continuous morphologies having different elastic moduli would be formed, so that when vibrations are applied, large strains are locally generated in the amorphous portions having lower elastic moduli, whereby consequently generating shearing frictions based on strains to improve energy loss. Accordingly, it is considered that the polyamide resin generally contains larger proportions of amorphous portions, but the polyamide resin has crystallinity in the present invention, so that it is possible to even more improve energy loss of the resin matrix.

The method for preparing a polyamide resin having crystallinity includes a method of using a diamine, a dicarboxylic acid, a lactam or an aminocarboxylic acid with high purity; and a method of selecting or the like a diamine, a dicarboxylic acid, a lactam or an aminocarboxylic acid having a smaller side chain. Here, a resin having crystallinity as used herein refers to a resin in which exothermic peaks accompanying crystallization are observed when a resin is heated from 25° C. to 300° C. at a heating rate of 20° C./min, held in that state for 5 minutes, and thereafter cooled to 25° C. or lower at a rate of −20° C./min, as prescribed in JIS K7122 (1999). More specifically, the resin refers to a resin having crystallization enthalpy ΔHmc calculated from areas of exothermic peaks of 1 J/g or more. As the polyamide resin constituting the present invention, it is preferable that a resin having a crystallization enthalpy ΔHmc of preferably 5 J/g or more, more preferably 10 J/g or more, even more preferably 15 J/g or more, and still even more preferably 30 J/g or more is used.

Specific examples of the polyamide resin include polycaproamide (Polyamide 6), polyhexamethylene adipamide (Polyamide 66), polycaproamide/polyhexamethylene adipamide copolymer (Polyamide 6/66), polytetramethylene adipamide (Polyamide 46), polyhexamethylene sebacamide (Polyamide 610), polyhexamethylene dodecamide (Polyamide 612), polyundecamide (Polyamide 11), polydodecamide (Polyamide 12), polyhexamethylene adipamide/polyhexamethylene terephthalamide copolymer (Polyamide 66/6T), polyhexamethylene adipamide/polyhexamethylene terephthalamide/polyhexamethylene isophthalamide copolymer (Polyamide 66/6T/6I), polyhexamethylene terephthalamide/polyhexamethylene isophthalamide copolymer (Polyamide 6T/6I), polyhexamethylene adipamide/polyhexamethylene isophthalamide copolymer (Polyamide 66/6I), polyhexamethylene adipamide/polyhexamethylene isophthalamide/polycaproamide copolymer (Polyamide 66/6I/6), polyxylene adipamide (Polyamide XD6), and mixtures or copolymers thereof, and the like. These can be used alone or in a combination of two or more kinds. Among them, Polyamide 6, Polyamide 66, Polyamide 11, Polyamide 12, Polyamide 610, Polyamide 612, Polyamide 6/66 copolymer, Polyamide 66/6I copolymer, and Polyamide 66/6I/6 copolymer are preferred, Polyamide 6, Polyamide 66, Polyamide 11, Polyamide 12, Polyamide 610, Polyamide 612, and Polyamide 6/66 are more preferred, and Polyamide 6, Polyamide 66, Polyamide 11, and Polyamide 12 are even more preferred.

The content of the polyamide resin in the polyamide resin composition is preferably 40% by mass or more, more preferably 50% by mass or more, and even more preferably 55% by mass or more, from the viewpoint of improving flexural modulus, suppressing the lowering of loss factor, and having impact resistance. In addition, the content is preferably 90% by mass or less, more preferably 80% by mass or less, even more preferably 75% by mass or less, and even more preferably 70% by mass or less.

[Plasticizer]

The polyamide resin composition constituting a fan of the present invention contains a plasticizer, from the viewpoint of improving loss factor of the fan. By adding the plasticizer, not only loss factor in the room temperature region is improved but also loss factor in wide temperature regions such as a low-temperature region and a high-temperature region can be improved at the same time. Here, the high-temperature region as used herein refers to a temperature atmosphere of from 35° to 80° C. or so, and the low-temperature region as used herein refers to a temperature atmosphere of from −20° to 10° C. or so.

The plasticizer in the present invention is not particularly limited as long as the plasticizer is a plasticizer applicable to the polyamide resin, and an amide-based plasticizer, an ester-based plasticizer, or an amide ester-based plasticizer can be used. By containing the above plasticizer, amorphous portions of the polyamide resin are made flexible, and by distributing the plasticizer, the distribution of flexibility of the amorphous portions is spread, so that excellent vibration-damping property is exhibited without depending upon the environmental temperature in which a fan of the present invention is placed.

The amide-based plasticizer includes carboxylic acid amide-based plasticizers and sulfonamide-based plasticizers.

The carboxylic acid amide-based plasticizer includes amides of one or more acids selected from the group consisting of benzoic acid, phthalic acid, trimellitic acid, pyromellitic acid and anhydrides thereof, and a dialkylamine of which alkyl group has from 2 to 8 carbon atoms. In addition, the dialkylamine of which alkyl group has from 2 to 8 carbon atoms includes diethylamine, dipropylamine, dibutylamine, dihexylamine, di2-ethylhexylamine, dioctylamine, and the like. The molecular weight of the carboxylic acid amide plasticizer is preferably 250 or more and 2,000 or less, more preferably 300 or more and 1,500 or less, and even more preferably 350 or more and 1,000 or less.

The sulfonamide-based plasticizer includes aromatic sulfonamide-based plasticizers. Specific examples include N-butylbenzenesulfonamide, benzenesulfonamide, p-toluenesulfonamide, o,p-toluenesulfonamide, N-(2-hydroxypropyl)benzenesulfonamide, N-ethyl-o,p-toluenesulfonamide, N-ethyl-p-toluenesulfonamide, and N-methyl-p-toluenesulfonamide. N-Butylbenzenesulfonamide is preferred.

The ester-based plasticizer includes monoester-based plasticizers, diester-based plasticizers, triester-based plasticizers, and polyester-based plasticizers.

The monoester-based plasticizer includes, for example, benzoic acid ester-based plasticizers and stearic acid ester-based plasticizers.

The benzoic acid ester-based plasticizer includes benzoic acid esters of benzoic acid and an aliphatic alcohol having from 6 to 20 carbon atoms or an alkylene oxide adduct (the number of moles of alkylene oxide added being 10 mol or less), of which alkylene oxide has from 2 to 4 carbon atoms, of the aliphatic alcohol. Specific examples thereof include 2-ethylhexyl p-oxybenzoate and 2-hexyldecyl p-oxybenzoate. The stearic acid ester-based plasticizer includes stearic acid esters of stearic acid and an aliphatic alcohol having from 1 to 18 carbon atoms or an alkylene oxide adduct (the number of moles of alkylene oxide added being 10 mol or less), of which alkylene oxide has from 2 to 4 carbon atoms, of the aliphatic alcohol. Specific examples thereof include methyl stearate, ethyl stearate, butyl stearate, and hexyl stearate.

The diester-based plasticizer includes diester-based plasticizers of one or more acids selected from the group consisting of phthalic acid, terephthalic acid, adipic acid, maleic acid, azelaic acid, sebacic acid, and anhydrides thereof, and one or more alcohols selected from the group consisting of aliphatic alcohols, alicyclic alcohols, and aromatic alcohols. Specific examples include butylbenzyl phthalate, dilauryl phthalate, diheptyl phthalate, dibutyl phthalate, dimethyl phthalate, dicyclohexyl phthalate, diethyl phthalate, diisodecyl phthalate, dioctyl phthalate, dioctyl adipate, diisodecyl adipate, di(butoxyethyl) adipate, di-2-ethylhexyl azelate, di-2-ethylhexyl maleate, dibutyl maleate, dioctyl sebacate, and dibutyl sebacate.

The triester-based plasticizer includes triester-based plasticizers of one or more acids selected from the group consisting of citric acid, trimellitic acid, phosphoric acid, and anhydrides thereof, and one or more alcohols selected from the group consisting of aliphatic alcohols, alicyclic alcohols, and aromatic alcohols. Specific examples include citric acid triesters such as triethyl citrate, tributyl citrate, and tris(2-ethylhexyl) citrate; trimellitic acid triesters such as tributyl trimellitate, trioctyl trimellitate, and tris(2-ethylhexyl) trimellitate; and phosphoric acid triesters such as tricresyl phosphate, tris(isopropylphenyl) phosphate, tributyl phosphate, triethyl phosphate, trioctyl phosphate, tris($\beta$-chloroethyl) phosphate, tris(dichloropropyl) phosphate, tris(butoxyethyl) phosphate, tris($\beta$-chloropropyl) phosphate, triphenyl phosphate, and octyldiphenyl phosphate.

The polyester-based plasticizer is a plasticizer having four or more ester groups, and includes pyromellitic acid-based compounds, and trialkyl acetylcitrate-based compounds.

The amide ester-based plasticizer includes an amide ester of one or more acids selected from the group consisting of phthalic acid, trimellitic acid, pyromellitic acid and anhydrides thereof, a dialkylamine of which alkyl group has from 2 to 8 carbon atoms, and an aliphatic alcohol having from 6 to 20 carbon atoms or an alkylene oxide adduct (the number of moles of alkylene oxide added being 10 mol or less), of which alkylene oxide has from 2 to 4 carbon atoms, of the aliphatic alcohol. In addition, the dialkylamine of which alkyl group has from 2 to 8 carbon atoms includes diethylamine, dipropylamine, dibutylamine, dihexylamine, di2-ethylhexylamine, dioctylamine, and the like. In addition, the aliphatic alcohol having from 6 to 20 carbon atoms includes n-hexanol, 2-ethylhexanol, n-octanol, i-nonyl alcohol, decanol, lauryl alcohol, cetyl alcohol, i-tridecanol, hexyldecanol, oleyl alcohol, octyldodecanol, and the like. In addition, the alkylene oxide adduct of which alkylene oxide has from 2 to 4 carbon atoms of the aliphatic alcohol having from 6 to 20 carbon atoms includes adducts of one or more members of ethylene oxide, propylene oxide, and butylene oxide of the above aliphatic alcohol having from 6 to 20 carbon atoms. The number of moles of the alkylene oxide added is preferably 10 mol or less, and more preferably 5 mol or less, based on 1 mol of the alcohol. The molecular weight of the amide ester-based plasticizer is preferably 250 or more and 2,000 or less, more preferably 300 or more and 1,500 or less, and even more preferably 350 or more and 1,000 or less.

In addition, besides the above plasticizer, an epoxy-based plasticizer, a plasticizer for rubber, a paraffin chloride, a polyhydric alcohol and a derivative thereof, an alcohol, a caprolactam, an oligoamide, a metal halide and the like can be used.

The content of one or more members selected from the group consisting of amide-based plasticizers, ester-based plasticizers, and amide ester-based plasticizers is preferably 50% by mass or more, more preferably 80% by mass or more, even more preferably 90% by mass or more, even more preferably 95% by mass or more, even more preferably substantially 100% by mass, and even more preferably 100% by mass, of the plasticizer, from the viewpoint of improving loss factor of the fan. Substantially 100% by mass, as used herein, refers to a case where the trace amounts of impurities are inevitably included. In addition, the above-mentioned content of the plasticizer as used herein means a total content when plural compounds are contained.

The content of the plasticizer, based on 100 parts by mass of the polyamide resin, may be 7 part by mass or more and 35 parts by mass or less. The content is preferably 10 parts by mass or more, and more preferably 15 parts by mass or more, from the viewpoint of impact resistance, from the viewpoint of improving loss factor, and from the viewpoint of improving loss factor over a wide temperature region, and the content is preferably 30 parts by mass or less, more preferably 25 parts by mass or less, even more preferably 20 parts by mass or less, and even more preferably 18 parts by mass or less, from the viewpoint of improving flexural modulus, from the viewpoint of suppressing the lowering of loss factor, and from the viewpoint of improving loss factor over a wide temperature region.

In addition, the content of the plasticizer in the polyamide resin composition is preferably 5% by mass or more, more preferably 8% by mass or more, and even more preferably 9% by mass or more, from the viewpoint of improving impact resistance and loss factor, and from the viewpoint of improving loss factor over a wide temperature region, and the content is preferably 30% by mass or less, more preferably 20% by mass or less, and even more preferably 15% by mass or less, from the viewpoint of improving flexural modulus, from the viewpoint of suppressing the lowering of loss factor, and from the viewpoint of improving loss factor over a wide temperature region.

In addition, since from the conversion of temperature-frequency of the polymer, exhibiting high loss factor in a wide temperature region can be similarly said as exhibiting high loss factor in a wide frequency region, it is preferable that a plasticizer is added within the range as defined above, also from the viewpoint of realizing high loss factor over a wide frequency region. Furthermore, flexibility of the resin is improved and impact strength is improved by adding a plasticizer, so that the addition of the plasticizer is preferred also from the viewpoint of keeping high impact strength in addition to high loss factor and high elastic modulus.

Moreover, some effects are exhibited that flowability is improved and moldability during injection molding is improved by adding a plasticizer.

[Filler]

The polyamide resin composition constituting a fan of the present invention contains a filler, from the viewpoint of improving loss factor. As the filler in the present invention, one or more members selected from the group consisting of plate-like fillers, and acicular fillers that are usable in the reinforcement of thermoplastic resins are preferably used.

The plate-like fillers refer to those having an aspect ratio (length of the longest side of the largest surface of the plate-like filler/thickness of the surface) of 2 or more and 150 or less, and a ratio of a length to a breadth of a cross section substantially orthogonal to an axis extending in a longitudinal direction (cross-sectional ratio of length to breadth) calculated by the following formula of 2 or more and less than 150.

Cross-sectional ratio of length to breadth=largest length in a cross section substantially orthogonal to an axis extending in a longitudinal direction/smallest breadth in the same cross section The length of the plate-like filler (length of the longest side in the largest surface) is preferably 1.0 μm or more, more preferably 2 μm or more, and even more preferably 3 μm or more, and preferably 150 μm or less, more preferably 100 μm or less, even more preferably 50 μm or less, even more preferably 30 μm or less, and even more preferably 15 μm or less, from the viewpoint of obtaining excellent dispersibility in the polyamide resin composition, improving flexural modulus, and suppressing the lowering of loss factor. The thickness is, but not particularly limited to, preferably 0.01 μm or more, more preferably 0.05 μm or more, and even more preferably 0.1 μm or more, and preferably 5 μm or less, more preferably 3 μm or less, even more preferably 1 μm or less, even more preferably 0.5 μm or less, and even more preferably 0.3 μm or less, from the same viewpoint.

In addition, the aspect ratio of the plate-like filler is preferably 5 or more, more preferably 10 or more, and even more preferably 20 or more, and preferably 120 or less, more preferably 90 or less, even more preferably 70 or less, and even more preferably 50 or less, from the same viewpoint. In addition, the cross-sectional ratio of length to breadth of the plate-like filler is preferably 3 or more, and more preferably 5 or more, and preferably 50 or less, more preferably 30 or less, even more preferably 20 or less, even more preferably 10 or less, and even more preferably 8 or less.

Specific examples of the plate-like filler include, for example, glass flake, non-swellable mica, swellable mica, graphite, metal foil, talc, clay, mica, sericite, zeolite, bentonite, organic modified bentonite, montmorillonite, organic modified montmorillonite, dolomite, smectite, hydrotalcite, plate-like iron oxide, plate-like calcium carbonate, plate-like magnesium hydroxide, plate-like barium sulfate, and the like. Among them, talc, mica, or plate-like barium sulfate is preferred, talc or mica is more preferred, and talc is even more preferred, from the viewpoint of improving flexural modulus and suppressing the lowering of loss factor. Here, the length and the thickness of the plate-like filler can be obtained by observing randomly chosen 100 fillers with an optical microscope, and calculating an arithmetic mean thereof.

The acicular filler refers to those having an aspect ratio (particle length/particle size) within the range of 2 or more and 150 or less, and the filler has a ratio of length to breadth in a cross section (cross-sectional ratio of length to breadth) calculated by the above formula of 1 or more and less than 2. The length of the acicular filler (particle length) is preferably 1.0 μm or more, more preferably 5 μm or more, even more preferably 10 μm or more, even more preferably 20 μm or more, and even more preferably 30 μm or more, and preferably 150 μm or less, more preferably 100 μm or less, even more preferably 80 μm or less, and even more preferably 60 μm or less, from the viewpoint of obtaining excellent dispersibility in the polyamide resin composition, improving flexural modulus, and suppressing the lowering of loss factor. The particle size is, but not particularly limited to, preferably 0.01 μm or more, more preferably 0.1 μm or more, and even more preferably 0.5 μm or more, and preferably 20 μm or less, more preferably 15 μm or less, and even more preferably 10 μm or less, from the same viewpoint.

In addition, the aspect ratio of the acicular filler is preferably 3 or more, and more preferably 5 or more, and preferably 120 or less, more preferably 90 or less, even more preferably 70 or less, even more preferably 50 or less, even more preferably 30 or less, even more preferably 20 or less, and even more preferably 10 or less, from the same viewpoint. In addition, the cross-sectional ratio of length to breadth of the acicular filler is preferably 1.2 or more, and more preferably 1.5 or more, and preferably 1.8 or less.

Specific examples of the acicular filler include, for example, potassium titanate whiskers, aluminum borate whiskers, magnesium-based whiskers, silicon-based whiskers, wollastonite, sepiolite, asbestos, zonolite, phosphate fibers, ellestadite, slag fibers, gypsum fibers, silica fibers, silica alumina fibers, zirconia fibers, boron nitride fibers, silicon nitride fibers, boron fibers, and the like. Among them, potassium titanate whiskers and wollastonite are preferred. Here, the particle length and the particle size of the acicular filler can be obtained by observing 100 randomly chosen fillers with an optical microscope, and calculating an arithmetic mean thereof. In a case where the particle size has a length and a breadth, the average particle size is calculated using the length.

These plate-like fillers and acicular fillers can be used alone or in a combination of two or more kinds, and the forms at the time of combining are not particularly limited. The content of one or more members selected from the group consisting of plate-like fillers and acicular fillers may be, based on 100 parts by mass of the polyamide resin, 15 parts by mass or more and 80 parts by mass or less, and is preferably 20 parts by mass or more, more preferably 25 parts by mass or more, and even more preferably 30 parts by mass or more, from the viewpoint of improving flexural modulus, and the content is preferably 60 parts by mass or less, more preferably 50 parts by mass or less, and even more preferably 40 parts by mass or less, from the viewpoint of suppressing the lowering of loss factor.

In addition, the content of one or more members selected from plate-like fillers and acicular fillers in the fillers usable in the present invention is preferably 50% by mass or more, more preferably 70% by mass or more, even more preferably 80% by mass or more, even more preferably 90% by mass or more, even more preferably 95% by mass or more, even more preferably substantially 100% by mass, and even more preferably 100% by mass, from the viewpoint of suppressing the lowering of loss factor. Here, substantially 100% by mass, as used herein, refers to a case where impurities and the like are inevitably included. In addition, the content of the fillers as used herein means a total content when plural compounds are contained.

In addition, in the present invention, fillers other than plate-like fillers and acicular fillers can be used, within the range that would not impair the effects of the present invention. Specifically, preferred ones include fibrous fillers and granular fillers that are usable in the reinforcement of thermoplastic resins, and among them, fibrous fillers are more preferred.

The fibrous filler refers to those having an aspect ratio (average fiber length/average fiber diameter) of exceeding 150. The length of the fibrous filler (average fiber length) is preferably 0.15 mm or more, more preferably 0.2 mm or more, even more preferably 0.5 mm or more, and even more preferably 1 mm or more, and preferably 30 mm or less, more preferably 10 mm or less, and even more preferably 5 mm or less, from the viewpoint of improving flexural modulus and suppressing the lowering of loss factor. The average fiber diameter is, but not particularly limited thereto, preferably 1 µm or more, more preferably 3 µm or more, even more preferably 5 µm or more, and even more preferably 10 µm or more, and preferably 30 µm or less, more preferably 25 µm or less, and even more preferably 20 µm or less, from the same viewpoint. In addition, the aspect ratio is preferably 160 or more, more preferably 180 or more, and even more preferably 200 or more, and preferably 10,000 or less, more preferably 5,000 or less, even more preferably 1,000 or less, even more preferably 800 or less, even more preferably 500 or less, and even more preferably 300 or less, from the same viewpoint.

Specific examples of the fibrous filler include, for example, glass fibers, carbon fibers, graphite fibers, metal fibers, cellulose fibers, and the like. Among them, carbon fibers and glass fibers are preferred, and glass fibers are more preferred, from the same viewpoint. Here, the fiber length and the fiber diameter of the fibrous filler can be obtained by observing 100 randomly chosen fillers with an optical microscope, and calculating an arithmetic mean thereof. In a case where the fiber diameter has a length and a breadth, the average particle size is calculated using the length. In addition, as the fiber diameter, not only those that are in a circular form where a length and a breadth are the same, but also those having different length and breadth such as an elliptic form (for example, length/breadth=4) or an eyebrow form (for example, length/breadth=2) may be used. On the other hand, when a resin and a fibrous filler are melt-kneaded in order to prepare a resin composition using a kneader such as a twin-screw extruder, although the fibrous filler is cut with a shearing force in the kneading portion to shorten the average fiber length, the average fiber length of the fibrous filler in the resin is preferably from 100 to 800 µm, more preferably from 200 to 700 µm, and even more preferably from 300 to 600 µm, from the same viewpoint.

The above fibrous fillers can be used alone or in a combination of two or more kinds. The content of the fibrous filler, based on 100 parts by mass of the polyamide resin, is preferably 1 part by mass or more, and more preferably 3 parts by mass or more, and preferably 20 parts by mass or less, more preferably 10 parts by mass or less, and even more preferably 7 parts by mass or less, from the viewpoint of improving flexural modulus of the resin composition, and at the same time suppressing the lowering of loss factor and the lowering of impact resistance. In addition, the content of the fibrous filler in the filler usable in the present invention is preferably 3% by mass or more, more preferably 5% by mass or more, and even more preferably 10% by mass or more, and preferably 30% by mass or less, more preferably 20% by mass or less, and even more preferably 15% by mass or less, from the viewpoint of improving flexural modulus, and at the same time suppressing the lowering of loss factor and the lowering of impact resistance.

In the present invention, the mass ratio of one or more fillers selected from the group consisting of plate-like fillers and acicular fillers to the fibrous filler [(plate-like filler+acicular filler)/fibrous filler] is preferably from 70/30 to 95/5, more preferably from 80/20 to 90/10, and even more preferably from 85/15 to 90/10, from the viewpoint of improving flexural modulus and suppressing the lowering of loss factor and the lowering of impact resistance.

The granular fillers include not only those showing the true spherical form but also those that are cross-sectional elliptic or substantially elliptic to some degree, and have an aspect ratio (longest diameter of the granular filler/shortest diameter of the granular filler) is 1 or more and less than 2, and one having an aspect ratio of nearly 1 is preferred. The average particle size of the granular filler is preferably 1.0 µm or more, more preferably 5 µm or more, even more preferably 10 µm or more, and even more preferably 20 µm or more, and preferably 50 µm or less, more preferably 40 µm or less, and even more preferably 30 µm or less, from the viewpoint of obtaining excellent dispersibility in the polyamide resin composition, improving flexural modulus, and suppressing the lowering of loss factor.

Specific examples include kaolin, fine silicic acid powder, feldspar powder, granular calcium carbonate, granular magnesium hydroxide, granular barium sulfate, aluminum hydroxide, magnesium carbonate, calcium oxide, aluminum oxide, magnesium oxide, titanium oxide, aluminum silicate, various balloons, various beads, silicon oxide, gypsum, novaculite, dawsonite, white clay, and the like. Among them, granular barium sulfate, aluminum hydroxide, and granular calcium carbonate are preferred, and granular calcium carbonate and granular barium sulfate are more preferred, from the viewpoint of flexural modulus. Here, the diameter of the granular filler can be obtained by cutting 100 randomly chosen fillers, observing the cross sections with an optical microscope, and calculating an arithmetic mean thereof.

The above granular filler can be used in alone or in a combination of two or more kinds. The content of the granular filler, based on 100 parts by mass of the polyamide resin, is preferably 3 parts by mass or more, and more preferably 4 parts by mass or more, and preferably 50 parts by mass or less, more preferably 30 parts by mass or less, even more preferably 15 parts by mass or less, even more preferably 10 parts by mass or less, and even more preferably 6 parts by mass or less, from the viewpoint of improving flexural modulus of the resin composition, and at the same time suppressing the lowering of loss factor and the lowering of impact resistance.

The above granular, plate-like, or acicular filler may be subjected to a coating or binding treatment with a thermoplastic resin such as an ethylene/vinyl acetate copolymer, or with a thermosetting resin such as an epoxy resin, or the filler may be treated with a coupling agent such as amino silane or epoxy silane.

The filler in the present invention may contain one or more members selected from the group consisting of plate-like fillers and acicular fillers. Among them, from the viewpoint of improving flexural modulus and suppressing the lowering of loss factor, it is preferable that one or more members selected from the group consisting of plate-like fillers and acicular fillers are used in combination with one or more members selected from the group consisting of granular fillers and fibrous fillers, and it is more preferable that one or more members selected from the group consisting of plate-like fillers and acicular fillers are used in combination with one or more members of fibrous fillers. Specifically, mica and/or talc and glass fibers are preferably used, and talc and glass fiber are more preferably used.

In the present invention, one or more members selected from the group consisting of plate-like fillers and acicular fillers may be used in an amount of 15 parts by mass or more and 80 parts by mass or less. A total content of the fillers used, based on 100 parts by mass of the polyamide resin, is preferably 20 parts by mass or more, more preferably 25 parts by mass or more, even more preferably 30 parts by mass or more, and even more preferably 35 parts by mass or more, from the viewpoint of improving loss factor, and the total content is preferably 55 parts by mass or less, and more preferably 50 parts by mass or less, from the viewpoint of suppressing the lowering of loss factor.

In addition, a total content of the fillers used in the polyamide resin composition is preferably 10% by mass or more, more preferably 15% by mass or more, and even more preferably 20% by mass or more, from the viewpoint of improving impact resistance, flexural modulus, and loss factor, and the content is preferably 45% by mass or less, more preferably 40% by mass or less, even more preferably 35% by mass or less, and even more preferably 30% by mass or less, from the viewpoint of suppressing the lowering of loss factor.

In the present invention, the mass ratio of the plasticizer to one or more fillers selected from the group consisting of plate-like fillers and acicular fillers [plasticizer/(plate-like filler+acicular filler)] is preferably from 0.15 to 0.8, more preferably from 0.25 to 0.6, and even more preferably from 0.3 to 0.4, from the viewpoint of improving flexural modulus and suppressing the lowering of loss factor.

[Organic Crystal Nucleating Agent]

In addition, the polyamide resin composition constituting a fan of the present invention can contain an organic crystal nucleating agent, from the viewpoint of improving crystallization velocity of the polyamide resin, improving crystallinity of the polyamide resin, and improving impact resistance, flexural modulus, and loss factor.

As the organic crystal nucleating agent, known organic crystal nucleating agents can be used, and organic metal salts of carboxylic acids, organic sulfonates, carboxylic acid amides, metal salts of phosphorus-containing compounds, metal salts of rosins, alkoxy metal salts, and the like can be used. Specifically, for example, the organic metal salts of carboxylic acids include sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanate, potassium octacosanate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, potassium dibenzoate, lithium dibenzoate, sodium β-naphthalate, and sodium cyclohexanecarboxylate. The organic sulfonates include sodium p-toluenesulfonate and sodium sulfoisophthalate. The carboxylic acid amides include stearamide, ethylenebis(lauric acid amide), palmitic acid amide, hydroxystearamide, erucic acid amide, trimesic acid tris(t-butylamide). The metal salts of phosphorus-containing compounds include sodium-2,2'-methylenebis(4,6-di-t-butylphenyl)phosphate. The metal salts of rosins include sodium dehydroabietate and sodium dihydroabietate. The alkoxy metal salts include sodium 2,2-methylbis(4,6-di-t-butylphenyl). Other organic crystal nucleating agents include benzylidene sorbitol and derivatives thereof.

The content of the organic crystal nucleating agent, based on 100 parts by mass of the polyamide resin, is preferably 0.01 parts by mass or more, more preferably 0.1 parts by mass or more, and even more preferably 0.5 parts by mass or more, from the viewpoint of improving impact resistance, flexural modulus, and loss factor, and the content is preferably 30 parts by mass or less, more preferably 20 parts by mass or less, even more preferably 10 parts by mass or less, even more preferably 5 parts by mass or less, and even more preferably 3 parts by mass or less, from the same viewpoint. Here, in the present specification, the content of the organic crystal nucleating agent means a total content of all the organic crystal nucleating agents contained in the polyamide resin composition.

[Elastomer]

The polyamide resin composition constituting a fan of the present invention can contain, for example, an elastomer as other components than those mentioned above, within the range that would not impair the effects of the present invention. The elastomer can be used alone or in two or more kinds. The elastomer in the present invention is preferably a thermoplastic elastomer.

(Thermoplastic Elastomer)

Since the polyamide resin composition constituting a fan of the present invention contains a thermoplastic elastomer, energy loss is exhibited in a resin moiety of the thermoplastic elastomer, so that the effects of further improving vibration-damping property of the polyamide resin composition are exhibited. Further by a combined use with a plasticizer, the vibration-damping property can be further improved in a wide temperature region including the high-temperature region and the low-temperature region.

In addition, the thermoplastic elastomer has a glass transition temperature Tg of preferably −40° C. or higher, and preferably 20° C. or lower, from the viewpoint of improving vibration-damping property in the high-temperature region and the low-temperature region.

The content of the thermoplastic elastomer, based on 100 parts by mass of the polyamide resin, is preferably 3 parts by mass or more, more preferably 5 parts by mass or more, even more preferably 10 parts by mass or more, and even more preferably 13 parts by mass or more, from the viewpoint of improving loss factor in the low-temperature region. Also, the content is preferably 40 parts by mass or less, more preferably 30 parts by mass or less, and even more preferably 20 parts by mass or less, from the viewpoint of suppressing loss factor in the high-temperature region.

In addition, the content of the thermoplastic elastomer in the polyamide resin composition is preferably 3% by mass or more, and more preferably 5% by mass or more, from the viewpoint of improving loss factor, and the content is preferably 25% by mass or less, more preferably 20% by mass or less, and even more preferably 15% by mass or less, from the same viewpoint.

The thermoplastic elastomer in the present invention is preferably at least one member selected from styrenic thermoplastic elastomers, olefinic thermoplastic elastomers, polyester-based thermoplastic elastomers, polyamide-based thermoplastic elastomers, urethane-based thermoplastic elastomers, nitrile-based thermoplastic elastomers, fluorine-based thermoplastic elastomers, polybutadiene-based thermoplastic elastomers, and silicone-based thermoplastic elastomers. The styrenic thermoplastic elastomers include polystyrene-vinyl-polyisoprene-polystyrene block copolymers, copolymers of styrene and butadiene and hydrogenated product thereof, and examples are "HYBRAR" manufactured by KURARAY PLASTICS CO., Ltd., "Tuftec" and "S.O.E" (registered trademarks) manufactured by Asahi Kasci Corporation, "SEPTON" (registered trademark) manufactured by Kuraray Co., Ltd., "RABALON" (registered trademark) manufactured by Mitsubishi Chemical Corporation, and the like. The olefinic thermoplastic elastomers include those in which an olefinic rubber (EPR, EPDM) is finely dispersed in a matrix made of an olefin-based resin (polyethylene, polypropylene, and the like), and examples are "THERMORAN" (registered trademark) manufactured by Mitsubishi Chemical Corporation, "ESPOLEX" (registered trademark) manufactured by Sumitomo Chemicals, Co., Ltd., and the like. The polyester-based thermoplastic elastomers include copolymers of polybutylene terephthalate and polyether, and the like, and examples are "Hytrel" (registered trademark) manufactured by DUPONT-TORAY CO., LTD., and the like. The polyamide-based thermoplastic elastomers include block copolymers of nylon with polyester or polyol or those in which a lactam or a polyether diol of a dicarboxylic acid as a raw material is subjected to transesterification and polycondensation reaction, and the like. The urethane-based thermoplastic elastomers are, for example, "TPU" manufactured by Nippon Polyurethane, Co., Ltd., and the like. The nitrile-based thermoplastic elastomers include those in which acrylonitrile and butadiene are subjected to emulsion polymerization, and the like. The fluorine-based thermoplastic elastomers include copolymers of vinylidene fluoride and hexafluoropropylene, copolymers of vinylidene fluoride, hexafluoropropylene, and tetrafluoroethylene, and the like, and examples are "FTOR" (registered trademark) manufactured by Showa Kobunshi Kabushiki Kaisha, "Viton" (registered trademark) Series manufactured by Dupont, and the like. The polybutadiene-based and the silicone-based thermoplastic elastomers include an organosilicon polymer binding product having a siloxane bond as a backbone in which an organic group or the like is directly bonded to the silicon atom and the like, and examples include KBM Series manufactured by Shin-Etsu Silicone, and the like. As the thermoplastic elastomers, the styrenic thermoplastic elastomers are preferred, from the viewpoint of improving vibration-damping properties in the high-temperature region and the low-temperature region.

(Styrenic Thermoplastic Elastomer)

The styrenic thermoplastic elastomer in the present invention (which may be hereinafter referred to as a styrenic elastomer in some cases) is composed of a block A in which a styrenic compound constituting a hard segment is polymerized and a block B in which a conjugated diene constituting a soft segment is polymerized. The styrenic compound used in the polymer block A includes, for example, styrenic compounds such as styrene, α-methylstyrene, o-methylstyrene, m-methylstyrene, p-methylstyrene, and 1,3-dimethylstyrene; polycyclic aromatic compounds having a vinyl group such as vinylnaphthalene and vinylanthracene, and the like. Among them, the polymer of the styrenic compound is preferred, and the polymer of styrene is more preferred. The conjugated diene used in the polymer block B includes, for example, butadiene, isoprene, butylene, ethylene, 1,3-pentadiene, 2,3-dimethyl-1,3-butadiene, and the like, and preferably includes polyisoprene, polybutadiene, and copolymers of isoprene and butadiene, which is a block copolymer of one or more members selected from these conjugated diene monomers. In addition, in the block B, the styrenic compound used in the above polymer block A may be copolymerized. In the case of each of the copolymers, as the forms thereof, any of the forms of random copolymers, block copolymers, and tapered copolymers can be selected. In addition, the styrenic compound may have a hydrogenated structure.

Specific examples of the styrenic elastomer described above include, for example, polystyrene-isoprene block copolymers (SIS), polystyrene-polybutadiene copolymers (SEBS), polystyrene-hydrogenated polybutadiene copolymers (SEBS), polystyrene-hydrogenated polyisoprene-polystyrene block copolymers (SEPS), polystyrene-vinyl-polyisoprene-polystyrene block copolymers (SHIVS), polystyrene-hydrogenated polybutadiene-hydrogenated polyisoprene-polystyrene block copolymers, polystyrene-hydrogenated polybutadiene-polyisoprene-polystyrene block copolymers, and the like. These styrenic elastomers may be used alone in a single kind or in combination of two or more kinds. In the present invention, in particular, it is preferable to use a polystyrene-vinyl-polyisoprene-polystyrene block copolymer, and a commercially available product of the block copolymer as described above includes "HYBRAR" Series manufactured by KURARAY PLASTICS CO., Ltd.

The styrene content in the styrenic elastomer is preferably 10% by mass or more, and more preferably 15% by mass or more, and preferably 30% by mass or less, and more preferably 25% by mass or less, from the viewpoint of improving vibration-damping property in the high-temperature region and the low-temperature region. Here, the high-temperature region as used herein means a temperature of from 35° to 80° C., and the low-temperature region as used herein means a temperature of from −20° to 10° C., and the styrene content in the styrenic elastomer can be measured in accordance with a known method, for example, using NMR.

The styrenic elastomer is preferably a styrene-butadiene block copolymer and/or a styrene-isoprene block copolymer.

(Styrene-Butadiene Block Copolymer)

Further, the polyester resin composition constituting a fan of the present invention may contain a styrene-butadiene block copolymer as an elastomer. By including the above component, a high vibration-damping effect at low temperatures can be expected. The styrene-butadiene block copolymer may have a hydrogenated structure. The styrene-butadiene block copolymer may be used together with a styrene-isoprene block copolymer, or may be used in place of the styrene-isoprene block copolymer described later.

Specific examples of the styrene-butadiene block copolymer described above include, for example, polystyrene-polybutadiene copolymers (SEBS), polystyrene-hydrogenated polybutadiene copolymers (SEBS), polystyrene-polybutadiene copolymers (SBS), polystyrene-hydrogenated polybutadiene copolymers (SBS), and the like. These styrene-butadiene block copolymers can be used alone in a single kind or in combination of two or more kinds. In the present invention, in particular, it is preferable to use a polystyrene-hydrogenated polybutadiene copolymer (SEBS), and a commercially available product of the block copolymer as described above includes "S. O. E" manufactured by ASAHI KASEI CHEMICALS.

(Styrene-Isoprene Block Copolymer)

Since the styrene-isoprene block copolymer is contained in the polyamide resin composition constituting a fan of the present invention, energy loss would be exhibited in a resin moiety of the styrene-isoprene block copolymer, so that the effects of further improving vibration-damping property of the polyamide resin composition are exhibited. Further, because of a combined use with the plasticizer, the vibration-damping property can be improved over a wide temperature region including the high-temperature region and the low-temperature region.

The styrene-isoprene block copolymer in the present invention is a block copolymer that has a polystyrene block at both the terminals, and at least one of the blocks of polyisoprene block or vinyl-polyisoprene block. In addition, the block copolymer may be copolymerized with an isoprene block or butadiene block, or may have a hydrogenated structure.

Specific examples of the styrene-isoprene block copolymer mentioned above include, for example, polystyrene-isoprene block copolymers (SIS), polystyrene-hydrogenated polyisoprene-polystyrene block copolymers (SEPS), polystyrene-vinyl-polyisoprene-polystyrene block copolymers (SHIVS), polystyrene-hydrogenated polybutadiene-hydrogenated polyisoprene-polystyrene block copolymers, polystyrene-hydrogenated polybutadiene-polyisoprene-polystyrene block copolymers, and the like. These copolymers may be used alone, or in a combination of two or more kinds. In the present invention, among them, it is preferable to use the polystyrene-vinyl-polyisoprene-polystyrene block copolymers, and a commercially available product of the block copolymer as mentioned above includes "HYBRAR" Series, manufactured by Kuraray Plastics Co., Ltd.

The polyamide resin composition constituting a fan of the present invention can contain, as other components besides those mentioned above, an inorganic crystal nucleating agent, a hydrolysis inhibitor, a flame retardant, an antioxidant, a lubricant such as a hydrocarbon-based wax or an anionic surfactant, an ultraviolet absorbent, an antistatic agent, an anti-clouding agent, a photostabilizer, a pigment, a mildewproof agent, a bactericidal agent, a blowing agent, or the like, within the range that would not impair the effects of the present invention. In addition, other polymeric materials and other resin compositions can be contained within the range that would not inhibit the effects of the present invention.

The polyamide resin composition constituting a fan of the present invention can be prepared without any particular limitations, so long as the composition contains a polyamide resin, a plasticizer in an amount of 7 parts by mass or more and 35 parts by mass or less, and one or more fillers selected from plate-like fillers and acicular fillers in an amount of 15 parts by mass or more and 80 parts by mass or less, based on 100 parts by mass of the polyamide resin. For example, the polyamide resin composition can be prepared by melt-kneading raw materials containing a polyamide resin, a plasticizer, and the above-mentioned filler, and further optionally various additives with a known kneader such as a closed kneader, a single-screw or twin-screw extruder, or an open roller-type kneader. After melt-kneading, the melt-kneaded product may be dried or cooled in accordance with a known method. The raw materials can also be subjected to melt-kneading after homogeneously mixing the raw materials with a Henschel mixer, a super mixer or the like in advance, or melt-kneading may be carried out by previously immersing the plasticizer into the polyamide resin, and thereafter adding the remaining raw materials thereto. Here, the melt-blending may be carried out in the presence of a supercritical gas in order to accelerate plasticity of the polyamide resin when the raw materials are melt-blended.

The melt-kneading temperature cannot be unconditionally set because the melt-kneading temperature depends upon the kinds of the polyamide resin used, and the melt-kneading temperature is preferably 220° C. or higher, more preferably 225° C. or higher, and even more preferably 230° C. or higher, and preferably 300° C. or lower, more preferably 290° C. or lower, even more preferably 280° C. or lower, even more preferably 260° C. or lower, even more preferably 250° C. or lower, and even more preferably 240° C. or lower, from the viewpoint of improving moldability and prevention of deterioration of the polyamide resin composition. The melt-kneading time cannot be unconditionally determined because the melt-kneading time depends upon a melt-kneading temperature and the kinds of a kneader, and the melt-kneading time is preferably from 15 to 900 seconds.

The kneaded product thus obtained has excellent vibration-damping property even though flexural modulus is high, so that the kneaded product can be suitably used as a fan usable in manufactured articles such as audio equipment, electric appliances, construction buildings, and industrial equipment, or parts thereof, by using various mold-processing methods such as injection molding, extrusion molding or thermoforming. In addition, since the fan of the present invention has a high flexural modulus even as a single material, the fan has an excellent vibration-damping property of being capable of sufficiently keeping the shape with a single material without having to use a high-rigidity material such as a metal steel plate, and can be preferably used in manufactured articles that are required to be light-weighted of automobiles, railcars, airplanes, or the like, or parts thereof. In other words, in the present invention, a polyamide resin composition containing a polyamide resin, a plasticizer in an amount of 7 parts by mass or more and 35 parts by mass or less, and one or more fillers selected from plate-like fillers and acicular fillers in an amount of 15 parts by mass or more and 80 parts by mass or less, based on 100 parts by mass of the polyamide resin can be used as one of materials for the fan. Here, the fan of the present invention may contain a known material which is applicable to the fan other than the polyamide resin composition mentioned above, and the content, the applicable locations, and the application method can be appropriately set in accordance with a conventional method in the art.

Furthermore, when the fan is rotated, the rotation noises such as rotation vibration sounds and interference noises become large, at the frequency calculated from the rotational speed and the number of fan blades. In addition, even at the frequency derived from the rotations and vibrations of the motor (examples thereof include cogging frequency, etc.), all sorts of noises such as rotation noises and vibration sounds of structural members become large. When the frequency of the rotation noises or the frequency of the vibration sounds of the structural members overlaps with the resonance frequency of the fan molded article or structural member and overall structure, vibration sounds or noises are considered to become even larger. However, the use of the fan of the present invention can reduce the vibrations or noises. Here, the natural frequency as used herein may be referred to as resonance frequency.

For example, supposing that the rotational speed of the fan is N, the number of fan blades is Z, the noises may increase at rotation noise peaks in multiples of integers of a frequency F=NZ/60, wherein F=NZk/60, and k is an integer of 1, 2, 3, and on. The use of the fan of the present invention remarkably exhibits reduced noise effects.

The fan of the present invention is a concept that embraces not just the part of the fan blades, but also structural members near the fan, for example, fan covers, fan casings, motor covers, ducts, baffle plates, bell mouth, hoods, and the like. Therefore, the materials for the fan blades are conventional plastics. For example, an embodiment where a material for a fan casing is a polyamide resin composition in the present invention also falls under the fan of the present invention, which exhibits excellent effects of vibration-damping property.

Further, since the fan of the present invention contains a polyamide resin composition as defined above, the fan has the properties of excellent weathering resistance, abrasion resistance, anti-fatigue property, heat-resistant degradation property, chemical resistance, oil resistance, and surface external appearance.

The application of the fan of the present invention to manufactured articles such as audio equipment, electric appliances, transportation vehicles, construction buildings, and industrial equipment, or parts thereof can be appropriately set according to the methods for producing parts, housings, apparatuses, and equipment, applied portions, and intended purposes, and the fan can be used in accordance with a conventional method in the art.

For example, when the fan of the present invention is produced by injection molding, the fan is obtained by filling pellets of the above polyamide resin composition constituting a fan in an injection-molding machine, and injecting molten pellets into a mold to mold.

In the injection molding, a known injection-molding machine can be used, including, for example, a machine comprising a cylinder and a screw inserted through an internal thereof as main constituting elements, e.g. J75E-D, J110AD-180H manufactured by The Japan Steel Works, Ltd. or the like. Here, although the raw materials for the above-mentioned polyamide resin composition constituting a fan may be supplied to a cylinder and directly melt-kneaded, it is preferable that a product previously melt-kneaded is filled in an injection-molding machine.

The set temperature of the cylinder is preferably 220° C. or higher, and more preferably 235° C. or higher. Also, the set temperature is preferably 290° C. or lower, more preferably 280° C. or lower, even more preferably 260° C. or lower, and even more preferably 255° C. or lower. When the melt-kneader is used, the set temperature means the set temperature of the cylinder of the kneader during melt-kneading. Here, the cylinder comprises some heaters, by which temperature control is carried out. The number of heaters cannot be unconditionally determined because the number depends on the kinds of machines, and it is preferable that the heaters controlled to the above-mentioned set temperature are present at least at the discharge outlet side of the melt-kneaded product, i.e. the side of tip end of nozzle.

The mold temperature is preferably 150° C. or lower, more preferably 140° C. or lower, and even more preferably 130° C. or lower. Also, the mold temperature is preferably 20° C. or higher, more preferably 30° C. or higher, and even more preferably 40° C. or higher, from the viewpoint of improving the crystallization velocity of the polyamide resin composition constituting the fan and improving operability. The holding time inside the mold cannot be unconditionally determined because the holding time differs depending upon the temperature of the mold. The holding time is preferably from 5 to 100 seconds, from the viewpoint of improving productivity of the molded article.

Here, as to the fan of the present invention, a molding method other than the injection-molding may be used so long as a polyamide resin composition as mentioned above is used, and the polyamide resin composition can be molded in accordance with a known method. It is preferable that the molding is carried out by also setting a mold temperature within a temperature as defined above.

The fan of the present invention thus obtained can be applied to manufactured articles having various kinds of fan, including, for example, household electric appliances with compressors such as microwave ovens and refrigerators; cooling fan devices set to housing cases for electronic equipment such as electronic cameras, image recorder-player devices, computers, and projectors; cooling fan devices for dissipating heat such as radiators and condensers for air-conditioning devices for automobiles or cooling fan or ventilation fan devices such as ventilators, electric fans, and air conditioners (fan heaters); motor covers for electric appliances; audio equipment such as speakers, television, radio cassette recorders, headphones, and audio components; and construction materials for soundproof walls, pipes, pipe ducts, and the like.

The kinds of the fan include centrifugal fan such as sirocco fan or turbo fan, side flow fan such as cross flow fan, axial flow fan such as mixed-flow turbin and propeller fan, those rotated and driven by electric generators driven by direct current or alternating current, and the like.

The shapes of the fan blades are diversified depending upon the kinds and applications, and examples are those having simple cross-sectional shapes such as arc shape and S-shape, and those with nature wings that have complicated shapes, such as those having "constrictions (narrowness in mid area)" or "waviness" as in wings of albatross or wings of butterflies, and those having less frictional resistance as in wings of dragonflies.

The sizes of the fan are diversified depending upon the kinds and the applications, and the size includes, for example, an outer shape diameter Φ of from 10 mm to 10,000 mm. The sizes of the blades are such that the length is from 10 mm to 10,000 mm, and the width is from 10 mm to 10,000 mm.

The frequency at which the vibration-damping effects are remarkably seen differs depending upon the size of the fan. For example, in fan having a size of 300 mm or larger, a central face would be large and blades themselves are large, so that the face itself becomes large, whereby even greater noises are generated. When even greater noises are generated, it is considered that the effects are greater than a case where a vibration-damping material is used. Also, when a central face is large or a length or width against a thickness of the blades is large, it is anticipated that the resonance frequency of the fan exists in a low-frequency side; therefore, low-frequency noises are generated, whereby it is anticipated that low-frequency noises can be reduced as the effects when using the vibration-damping material. On the other hand, in a fan having a size of, for example, smaller than 300 mm, it is anticipated that the resonance frequency of the fan exists in a high-frequency side; therefore, high-frequency noises are generated, whereby it is anticipated that high-frequency noises can be reduced as the effects when using the vibration-damping material.

The number of fan blades is diversified depending upon the kinds and applications, and the number may be as small as from 2 to 4 as in a propeller fan, and up to as many as 1,000 as in a sirocco fan.

When the number of blades (Z) is small, for example, 10 or less, it is anticipated that the frequency of rotation noises derived from F=NZk/60 exists in a low frequency side; therefore, low-frequency noises are generated, so that it is anticipated that mainly low-frequency noises can be reduced as the effects when using the vibration-damping material.

When the number of blades (Z) is large, for example, exceeding 20, it is anticipated that the frequency of rotation noises derived from F=NZk/60 exists in a high frequency side; therefore, high-frequency noises are generated, so that it is anticipated that mainly high-frequency noises can be reduced as the effects when using the vibration-damping material.

The conditions for the rotational speed using fan are diversified depending upon applications, ranging from those with a smaller rotational speed of 20 rpm to a larger rotational speed of 50,000 rpm.

When the rotational speed (N) is small, for example, 500 rpm or less, it is anticipated that the frequency of rotation noises derived from F=NZk/60 exists in a low frequency side; therefore, low-frequency noises are generated, so that it is anticipated that mainly low-frequency noises can be reduced as the effects when using the vibration-damping material.

When the rotational speed (N) is large, for example, exceeding 1,000 rpm, it is anticipated that the frequency of rotation noises derived from F=NZk/60 exists in a high frequency side; therefore, high-frequency noises are generated, so that it is anticipated that mainly high-frequency noises can be reduced as the effects when using the vibration-damping material.

In addition, generally the frequency at which the noises are increased includes frequency of peaks of rotation noises derived from F=NZk/60, frequency derived from rotations or vibrations of the motor, resonance frequency of the fan, resonance frequency of the structural members, and the like.

Also, the frequency at which noise reduction is markedly exhibited includes frequency of peaks of rotation noises derived from F=NZk/60, frequency derived from rotations or vibrations of the motor, the resonance frequency of the fan, the resonance frequency of the structural members, and the like.

Further, the noises are markedly increased when each of the frequency of peaks of rotation noises derived from F=NZk/60 or the frequency derived from rotations or vibrations of the motor mentioned above overlaps with the resonance frequency of the fan or the resonance frequency of the structural members, and moreover, noise reduction is exhibited when the fan of the present invention is used.

In addition, as the fan, when the rigidity such as elastic modulus or strength becomes higher, the amount of winds during the fan rotations can be increased. Also, as the fan, when the weight becomes smaller, the electric power consumption during the fan rotations can be reduced.

The overall structure of the fan includes diversified cases including a case where a fan is not provided with a cover, as a matter of course, a case where a fan is provided with a cover, a case where a vibration source such as a motor is covered, and a case where the vibration source is not covered. When covered, the vibration sounds are increased at the resonance frequency of the overall structure, so that it is considered that the effects according to the present invention are large.

In order to realize reduction of fan noises, at least one of suppression of vibrations of blades themselves of the fan, suppression of vibrations of structural members in the periphery of the fan, including, for example, a fan cover, a fan casing, a motor cover, a duct, a baffle plate, bell mouth, hood, or the like, suppression of vibrations derived from motors rotating the fan, suppression of vibrations derived from housing of motors and the like may be accomplished.

The application of the fan of the present invention to manufactured articles such as audio equipment, electric appliances, transportation vehicles, construction buildings, and industrial equipment, or parts or housing thereof can be appropriately set according to the methods for producing the parts, housings, apparatuses and equipment, applied portions, and intended purposes, and the fan can be used in accordance with a conventional method in the art.

The polyamide resin composition constituting a fan of the present invention can be also used, besides the fan, for speakers, television, radio cassette recorders, headphones, audio components, microphones, audio players, compact disc players, floppy(registered trademark), video players, etc. as materials for audio equipment housings; further electromotive tools such as electromotive drills and electromotive drivers, electric appliances with cooling functions such as computers, projectors, servers, and POS systems, washing machines, clothes dryers, air-conditioned indoor units, sewing machines, dishwashers, multifunctional photocopier machines, printers, scanners, hard disk drives, video cameras, humidifiers, air cleaners, cellular phones, dryers, etc. as materials for parts and housings of electric appliances with electromotive motors; electromotive toothbrushes, electromotive shavers, massaging machines, etc. as materials for parts and housings of vibrated source-containing electric appliances; generators, gas generators, etc. as materials for parts and housings of electric appliances with motors; refrigerators, automatic vending machines, air-conditioned external machines, dehumidifiers, domestic generators as materials for parts and housings of electric appliances with compressors; materials for interior materials such as dashboards, instrumental panels, floor, doors, and roofs, engine-related materials such as oil pans, front cover, and locker cover, car navigation, door trim, gear box, dash silencer, module carrier, etc. as materials for automobile parts; soundproof plates, road lighting luminaires, ETC (Electronic Toll Collection) facility members, etc. as materials for roads; interior materials such as floor, walls, side plates, ceiling, doors, chairs, and tables, housings or parts of motor-related area, gear case, pantagraph covers, various protective covers, etc. as materials for railcar parts; interior materials such as floor, walls, side plates, ceiling, chairs, and tables, housings or parts in the engine-related parts etc. as materials for airplane parts; housings or wall materials for engine room, housings or wall materials for instrumental measurement room, as materials for ship parts; walls, ceiling, floor, partition boards, soundproof walls, shutters, curtain rails, pipe ducts, staircases, doors, window frames, etc. as materials for construction; shooters, elevators (lifts), winches or hoists, escalators, conveyors, tractors, bulldozers, lawn mowers, etc. as materials for industrial equipment parts; respiratory organ-associated equipment, ear, nose and throat (ENT)-associated equipment, dental equipment, surgical equipment, etc. as materials for parts and housing of medical equipment, and the like. The applications of the above polyamide resin composition to these uses can be appropriately set depending upon the method for producing the parts, housings, apparatus, and equipment thereof, applied portions, and intended purposes, which can be used in accordance with a conventional method in the art.

The present invention also provides a manufactured article containing a fan of the present invention, and a method for producing a part or housing thereof.

The method for production is not particularly limited so long as the method includes the step of injection-molding a polyamide resin composition constituting a fan of the present invention to provide a fan, and steps can be appropriately added depending upon the kinds of the molded articles obtained.

Specifically, the embodiment includes the following steps:

step (1): melt-kneading a polyamide resin composition containing a polyamide resin, a plasticizer in an amount of 7 parts by mass or more and 35 parts by mass or less, and one or more components selected from plate-like fillers and acicular fillers in an amount of 15 parts by mass or more and 80 parts by mass or less, based on 100 parts by mass of the polyamide resin, to provide a melt-kneaded product of a polyamide resin composition; and step (2): injection-molding a melt-kneaded product of the polyamide resin composition obtained in the step (1) within a mold.

The step (1) is a step to provide a melt-kneaded product of a polyamide resin composition. Specifically, a melt-kneaded product can be prepared by melt-kneading raw materials containing a polyamide resin, a plasticizer in an amount of 7 parts by mass or more and 35 parts by mass or less, and one or more components selected from plate-like fillers and acicular fillers in an amount of 15 parts by mass or more and 80 parts by mass or less, based on 100 parts by mass of the polyamide resin, and optionally various additives at a temperature of preferably 220° C. or higher, more preferably 225° C. or higher, and even more preferably 230° C. or higher, and preferably 300° C. or lower, more preferably 290° C. or lower, even more preferably 280° C. or lower, even more preferably 260° C. or lower, even more preferably 250° C. or lower, and even more preferably 240° C. or lower.

The step (2) is a step of injection-molding a melt-kneaded product of the polyamide resin composition. Specifically, a melt-kneaded product obtained in the step (1) can be molded by filling into an injection-molding machine equipped with a cylinder previously heated to preferably 220° C. or higher, and more preferably 235° C. or higher, and preferably 290° C. or lower, more preferably 280° C. or lower, even more preferably 260° C. or lower, and even more preferably 255° C. or lower, and injecting into a mold at a temperature of preferably 150° C. or lower, more preferably 140° C. or lower, and even more preferably 130° C. or lower, and preferably 20° C. or higher, more preferably 30° C. or higher, and even more preferably 40° C. or higher.

The fan of the present invention thus obtained can be suitably used in a vibration-damping material and a manufactured article having vibration-soundproof property, or a part or housing thereof.

With respect to the above-mentioned embodiments, the present invention further discloses the following fan, methods for preventing vibration noises using a fan, and use of fan.

<1> A fan containing a polyamide resin composition containing:
a polyamide resin,
a plasticizer in an amount of 7 parts by mass or more and 35 parts by mass or less, and
one or more components selected from the group consisting of plate-like fillers and acicular fillers in an amount of 15 parts by mass or more and 80 parts by mass or less,
based on 100 parts by mass of the polyamide resin.

<2> The fan according to the above <1>, wherein the polyamide resin is preferably one or more members selected from the group consisting of the following (1) to (3):
(1) a copolymer of a polycondensate of a diamine and a dicarboxylic acid;
(2) a polymer of a polycondensate of a lactam or an aminocarboxylic acid; and
(3) a polymer containing two or more members selected from the group consisting of (1) and (2).

<3> The fan according to the above <2>, wherein as the diamine, an aliphatic diamine, an aromatic diamine, or a diamine having a ring structure is preferably used, more preferably tetramethylenediamine, hexamethylenediamine, octamethylenediamine, nonamethylenediamine, undecamethylenediamine, dodecamethylenediamine, or metaxylylenediamine, and even more preferably hexamethylenediamine.

<4> The fan according to the above <2>, wherein as the dicarboxylic acid, an aliphatic dicarboxylic acid, an aromatic dicarboxylic acid, or a dicarboxylic acid having a ring structure is preferred, more preferably adipic acid, heptanedicarboxylic acid, octanedicarboxylic acid, nonanedicarboxylic acid, undecanedicarboxylic acid, dodecanedicarboxylic acid, terephthalic acid, or isophthalic acid, and even more preferably adipic acid.

<5> The fan according to the above <2>, wherein as the lactam, a lactam having from 6 to 12 carbon atoms is preferred, more preferably ε-caprolactam, enanthlactam, undecanelactam, dodecanelactam, α-pyrrolidone, or α-piperidone, and even more preferably ε-caprolactam, undecanelactam, or dodecanelactam.

<6> The fan according to the above <2>, wherein as the aminocarboxylic acid, an aminocarboxylic acid having from 6 to 12 carbon atoms is preferred, more preferably 6-aminocaproic acid, 7-aminoheptanoic acid, 9-aminononanoic acid, 11-aminoundecanoic acid, or 12-aminododecanoic acid, and even more preferably 6-aminocaproic acid, 11-aminoundecanoic acid, or 12-aminododecanoic acid.

<7> The fan according to any one of the above <1> to <6>, wherein the polyamide resin has a glass transition temperature (Tg) of preferably 20° C. or higher, more preferably 25° C. or higher, even more preferably 30° C. or higher, and still even more preferably 35° C. or higher, and preferably 160° C. or lower, more preferably 150° C. or lower, even more preferably 140° C. or lower, and still even more preferably 130° C. or lower.

<8> The fan according to any one of the above <1> to <7>, wherein when a polyamide resin is heated from 25° C. to 300° C. at a heating rate of 20° C./min, held in that state for 5 minutes, and thereafter cooled to 25° C. or lower at a rate of −20° C./min, the crystallization enthalpy ΔHmc calculated from areas of exothermic peaks along with crystallization is preferably 5 J/g or more, more preferably 10 J/g or more, even more preferably 15 J/g or more, and even more preferably 30 J/g or more.

<9> The fan according to any one of the above <1> to <8>, wherein the polyamide resin is preferably polycaproamide (Polyamide 6), polyhexamethylene adipamide (Polyamide 66), polycaproamide/polyhexamethylene adipamide copolymer (Polyamide 6/66), polytetramethylene adipamide (Polyamide 46), polyhexamethylene sebacamide (Polyamide 610), polyhexamethylene dodecamide (Polyamide 612), polyundecamide (Polyamide 11), polydodecamide (Polyamide 12), polyhexamethylene adipamide/polyhexamethylene terephthalamide copolymer (Polyamide 66/6T), polyhexamethylene adipamide/polyhexamethylene terephthalamide/polyhexamethylene isophthalamide copolymer (Polyamide 66/6T/6I), polyhexamethylene terephthalamide/polyhexamethylene isophthalamide copolymer (Polyamide 6T/6I), polyhexamethylene adipamide/polyhexamethylene isophthalamide copolymer (Polyamide 66/6I), polyhexamethylene adipamide/polyhexamethylene isophthalamide/polycaproamide copolymer (Polyamide 66/6I/6), polyxylene adipamide (Polyamide XD6), and mixtures or copolymers thereof, more preferably Polyamide 6, Polyamide 66, Polyamide 11, Polyamide 12, Polyamide 610, Polyamide 612, Polyamide 6/66 copolymer, Polyamide 66/6I copolymer, and Polyamide 66/6I/6 copolymer, even more preferably Polyamide 6, Polyamide 66, Polyamide 11, Polyamide 12, Polyamide 610, Polyamide 612, and Polyamide 6/66, and even more preferably Polyamide 6, Polyamide 66, Polyamide 11, and Polyamide 12.

<10> The fan according to any one of the above <1> to <9>, wherein the content of the polyamide resin in the polyamide resin composition is preferably 40% by mass or more, more preferably 50% by mass or more, even more preferably 55% by mass or more, and even more preferably 60% by mass or more, and preferably 90% by mass or less, more preferably 80% by mass or less, even more preferably 75% by mass or less, and even more preferably 70% by mass or less.

<11> The fan according to any one of the above <1> to <10>, wherein the plasticizer is preferably one or more members selected from the group consisting of amide-based plasticizers, ester-based plasticizers, and amide ester-based plasticizers.

<12> The fan according to the above <11>, wherein the amide-based plasticizer is preferably one or more members selected from the group consisting of carboxylic acid amide-based plasticizers and sulfonamide-based plasticizers.

<13> The fan according to the above <11>, wherein the ester-based plasticizer is preferably one or more members selected from the group consisting of monoester-based plasticizers, diester-based plasticizers, triester-based plasticizers, and polyester-based plasticizers.

<14> The fan according to the above <11>, wherein the amide ester-based plasticizer is preferably composed of one or more acids selected from the group consisting of phthalic acid, trimellitic acid, pyromellitic acid and anhydrides thereof, a dialkylamine of which alkyl group has from 2 to 8 carbon atoms, and one or more compounds selected from the group consisting of an aliphatic alcohol having from 2 to 8 carbon atoms or an alkylene oxide adduct (the number of moles of alkylene oxide added being 10 mol or less) of which alkylene oxide has from 2 to 4 carbon atoms of the aliphatic alcohol.

<15> The fan according to any one of the above <11> to <14>, wherein the content of one or more components selected from the group consisting of amide-based plasticizers, ester-based plasticizers, and amide ester-based plasticizers is preferably 50% by mass or more, more preferably 80% by mass or more, even more preferably 90% by mass or more, even more preferably 95% by mass or more, even more preferably substantially 100% by mass, and even more preferably 100% by mass, of the plasticizer.

<16> The fan according to any one of the above <1> to <15>, wherein the content of the plasticizer, based on 100 parts by mass of the polyamide resin, is preferably 10 parts by mass or more, and more preferably 15 parts by mass or more, and preferably 30 parts by mass or less, more preferably 25 parts by mass or less, even more preferably 20 parts by mass or less, and even more preferably 18 parts by mass or less.

<17> The fan according to any one of the above <1> to <16>, wherein the content of the plasticizer in the polyamide resin composition is preferably 5% by mass or more, more preferably 8% by mass or more, and even more preferably 9% by mass or more, and preferably 30% by mass or less, more preferably 20% by mass or less, and even more preferably 15% by mass or less.

<18> The fan according to any one of the above <1> to <17>, wherein the plate-like fillers has an aspect ratio (length of the longest side of the largest surface of the plate-like filler/thickness of the surface) of 2 or more and 150 or less, and a ratio of a length to a breadth of a cross section substantially orthogonal to an axis extending in a longitudinal direction (cross-sectional ratio of length to breadth) calculated by the formula: cross-sectional ratio of length to breadth=largest length in a cross section substantially orthogonal to an axis extending in a longitudinal direction to smallest breadth in the same cross section of 2 or more and less than 150, and wherein the plate-like filler is preferably glass flake, non-swellable mica, swellable mica, graphite, metal foil, talc, clay, mica, sericite, zeolite, bentonite, organic modified bentonite, montmorillonite, organic modified montmorillonite, dolomite, smectite, hydrotalcite, plate-like iron oxide, plate-like calcium carbonate, plate-like magnesium hydroxide, or plate-like barium sulfate, more preferably talc, mica, or plate-like barium sulfate, even more preferably talc or mica, and even more preferably talc.

<19> The fan according to any one of the above <1> to <18>, wherein the acicular filler has an aspect ratio (particle length/particle size) within the range of 2 or more and 150 or less, and a ratio of length to breadth in a cross section (cross-sectional ratio of length to breadth) calculated by the above formula of 1 or more and less than 2, and wherein the acicular filler is preferably potassium titanate whiskers, aluminum borate whiskers, magnesium-based whiskers, silicon-based whiskers, wollastonite, sepiolite, asbestos, zonolite, phosphate fibers, ellestadite, slag fibers, gypsum fibers, silica fibers, silica alumina fibers, zirconia fibers, boron nitride fibers, silicon nitride fibers, and boron fibers, and more preferably potassium titanate whiskers and wollastonite.

<20> The fan according to any one of the above <1> to <19>, wherein the content of one or more components selected from the group consisting of plate-like fillers and acicular fillers, based on 100 parts by mass of the polyamide resin, is preferably 20 parts by mass or more, more preferably 25 parts by mass or more, and even more preferably 30 parts by mass or more, and preferably 60 parts by mass or less, more preferably 50 parts by mass or less, and even more preferably 40 parts by mass or less.

<21> The fan according to any one of the above <1> to <20>, wherein the content of one or more components selected from the group consisting of plate-like fillers and acicular fillers in the fillers used in the present invention is preferably 50% by mass or more, more preferably 70% by mass or more, even more preferably 80% by mass or more, even more preferably 90% by mass or more, even more preferably 95% by mass or more, even more preferably substantially 100% by mass, and even more preferably 100% by mass.

<22> The fan according to any one of the above <1> to <21>, preferably further containing one or more members selected from the group consisting of fibrous fillers and granular fillers, and more preferably one or more members of fibrous fillers.

<23> The fan according to the above <22>, wherein the fibrous filler has an aspect ratio (average fiber length/average fiber diameter) of exceeding 150, and wherein the fibrous filler is preferably glass fibers, carbon fibers, graphite fibers, metal fibers, or cellulose fibers, more preferably carbon fibers or glass fibers, and even more preferably glass fibers.

<24> The fan according to the above <22> or <23>, wherein the content of the fibrous filler, based on 100 parts by mass of the polyamide resin, is preferably 1 part by mass or more, and more preferably 3 parts by mass or more, and preferably 20 parts by mass or less, more preferably 10 parts by mass or less, and even more preferably 7 parts by mass or less.

<25> The fan according to any one of the above <22> to <24>, wherein the content of the fibrous filler in the filler usable in the present invention is preferably 3% by mass or more, more preferably 5% by mass or more, and even more preferably 10% by mass or more, and preferably 30% by mass or less, more preferably 20% by mass or less, and even more preferably 15% by mass or less.

<26> The fan according to any one of the above <22> to <25>, wherein the mass ratio of one or more fillers selected from the group consisting of plate-like fillers and acicular fillers to the fibrous filler [(plate-like filler+acicular filler)/fibrous filler] is preferably from 70/30 to 95/5, more preferably from 80/20 to 90/10, and even more preferably from 85/15 to 90/10.

<27> The fan according to the above <22>, wherein the granular filler has an aspect ratio (longest diameter of the granular filler/shortest diameter of the granular filler) is 1 or more and less than 2, and preferably nearly 1, and wherein the granular filler is preferably kaolin, fine silicic acid powder, feldspar powder, granular calcium carbonate, granular magnesium hydroxide, granular barium sulfate, aluminum hydroxide, magnesium carbonate, calcium oxide, aluminum oxide, magnesium oxide, titanium oxide, aluminum silicate, various balloons, various beads, silicon oxide, gypsum, novaculite, dawsonite, or white clay, more preferably granular barium sulfate, aluminum hydroxide, or granular calcium carbonate, and even more preferably granular calcium carbonate or granular barium sulfate.

<28> The fan according to the above <22> or <27>, wherein the content of the granular filler, based on 100 parts by mass of the polyamide resin, is preferably 3 parts by mass or more, and more preferably 4 parts by mass or more, and preferably 50 parts by mass or less, more preferably 30 parts by mass or less, even more preferably 15 parts by mass or less, even more preferably 10 parts by mass or less, and even more preferably 6 parts by mass or less.

<29> The fan according to any one of the above <1> to <28>, wherein the plate-like, granular, or acicular filler may be subjected to a coating or binding treatment with a thermoplastic resin such as an ethylene/vinyl acetate copolymer, or with a thermosetting resin such as an epoxy resin, or the filler may be treated with a coupling agent such as amino silane or epoxy silane.

<30> The fan according to any one of the above <22> to <29>, wherein it is preferable that one or more members selected from the group consisting of plate-like fillers and acicular fillers are used in combination with one or more members selected from the group consisting of granular fillers and fibrous fillers, and it is more preferable that one or more members selected from the group consisting of plate-like fillers and acicular fillers are used in combination with one or more members of fibrous fillers.

<31> The fan according to any one of the above <1> to <30>, wherein a total content of the fillers used, based on 100 parts by mass of the polyamide resin, is preferably 20 parts by mass or more, more preferably 25 parts by mass or more, even more preferably 30 parts by mass or more, and even more preferably 35 parts by mass or more, and preferably 55 parts by mass or less, and more preferably 50 parts by mass or less.

<32> The fan according to any one of the above <1> to <31>, wherein a total content of the fillers used in the polyamide resin composition is preferably 10% by mass or more, more preferably 15% by mass or more, and even more preferably 20% by mass or more, and preferably 45% by mass or less, more preferably 40% by mass or less, even more preferably 35% by mass or less, and even more preferably 30% by mass or less.

<33> The fan according to any one of the above <1> to <32>, wherein the mass ratio of the plasticizer to one or more fillers selected from the group consisting of plate-like fillers and acicular fillers [plasticizer/(plate-like filler+acicular filler)] is preferably from 0.15 to 0.8, more preferably from 0.25 to 0.6, and even more preferably from 0.3 to 0.4.

<34> The fan according to any one of the above <1> to <33>, further containing an organic crystal nucleating agent.

<35> The fan according to the above <34>, wherein the content of the organic crystal nucleating agent, based on 100 parts by mass of the polyamide resin, is preferably 0.01 parts by mass or more, more preferably 0.1 parts by mass or more, and even more preferably 0.5 parts by mass or more, and preferably 30 parts by mass or less, more preferably 20 parts by mass or less, even more preferably 10 parts by mass or less, even more preferably 5 parts by mass or less, and even more preferably 3 parts by mass or less.

<36> The fan according to any one of the above <1> to <35>, further containing an elastomer, preferably a thermoplastic elastomer, more preferably a styrenic thermoplastic elastomer, and even more preferably a styrene-isoprene block copolymer and/or a styrene-butadiene block copolymer.

<37> The fan according to the above <36>, wherein the content of the elastomer, preferably a thermoplastic elastomer, based on 100 parts by mass of the polyamide resin, is preferably 3 parts by mass or more, more preferably 5 parts by mass or more, even more preferably 10 parts by mass or more, and even more preferably 13 parts by mass or more, and preferably 40 parts by mass or less, more preferably 30 parts by mass or less, and even more preferably 20 parts by mass or less.

<38> The fan according to any one of the above <1> to <37>, which is prepared by melt-kneading raw materials containing a polyamide resin, a plasticizer in an amount of 7 parts by mass or more and 35 parts by mass or less, and one or more components selected from plate-like fillers and acicular fillers in an amount of 15 parts by mass or more and 80 parts by mass or less, based on 100 parts by mass of the polyamide resin, and further optionally various additives.

<39> The fan according to the above <38>, wherein the melt-kneading temperature is preferably 220° C. or higher, more preferably 225° C. or higher, and even more preferably 230° C. or higher, and preferably 300° C. or lower, more preferably 290° C. or lower, even more preferably 280° C. or lower, even more preferably 260° C. or lower, even more preferably 250° C. or lower, and even more preferably 240° C. or lower.

<40> Use of a fan as defined in any one of the above <1> to <39> as a vibration-damping material.

<41> A manufactured article such as audio equipment, electric appliances, transportation vehicles, construction buildings, and industrial equipment, obtainable by a method including filling a polyamide resin composition constituting a fan as defined in any one of the above <1> to <39> in an injection-molding machine, and injecting the polyamide resin composition into a mold to mold, or parts or housing thereof.

<42> A motor cover for electric appliances containing a polyamide resin composition usable in any one of the above <1> to <39>.

<43> An air conditioner containing a polyamide resin composition usable in any one of the above <1> to <39>.

<44> A speaker containing a polyamide resin composition usable in any one of the above <1> to <39>.

<45> A projector containing a polyamide resin composition usable in any one of the above <1> to <39>.

<46> An electric appliance attached with compressors containing a polyamide resin composition usable in any one of the above <1> to <39>.

<47> A pipe containing a polyamide resin composition usable in any one of the above <1> to <39>.

<48> A method for reducing vibration noises generated by a motor cover for electric appliances, characterized by the use of a polyamide resin composition usable in any one of the above <1> to <39>.

<49> A method for reducing vibration noises generated by an air conditioner, characterized by the use of a polyamide resin composition usable in any one of the above <1> to <39>.

<50> A method for reducing vibration noises generated by a speaker, characterized by the use of a polyamide resin composition usable in any one of the above <1> to <39>.

<51> A method for reducing vibration noises generated by a projector, characterized by the use of a polyamide resin composition usable in any one of the above <1> to <39>.

<52> A method for reducing vibration noises generated by an electric appliance attached with compressors, characterized by the use of a polyamide resin composition usable in any one of the above <1> to <39>.

<53> A method for reducing vibration noises generated by a pipe, characterized by the use of a polyamide resin composition usable in any one of the above <1> to <39>.

<54> A method for producing a part or housing comprising a fan, including the steps of:
step (1): melt-kneading a polyamide resin composition containing a polyamide resin, a plasticizer in an amount of 7 parts by mass or more and 35 parts by mass or less, and one or more components selected from the group consisting of plate-like fillers and acicular fillers in an amount of 15 parts by mass or more and 80 parts by mass or less, based on 100 parts by mass of the polyamide resin, to provide a melt-kneaded product of a polyamide resin composition; and
step (2): injection-molding the melt-kneaded product of a polyamide resin composition obtained in the step (1) in a mold.

<55> The fan according to any one of the above <1> to <39>, wherein the fan is any one of blades of fan, fan covers, fan casings, motor covers, ducts, baffle plates, bell mouth, and hoods.

EXAMPLES

The present invention will be described more specifically by means of the following Examples. The examples are given solely for the purposes of illustration and are not to be construed as limitations of the present invention. Parts in Examples are parts by mass unless specified otherwise. Here, "ambient pressure" means 101.3 kPa, and "ambient temperature" means 25° C.

[Glass Transition Temperature of Polyamide Resin]

Using a DMA apparatus (EXSTAR6000, manufactured by SII), a flat test piece (40 mm×5 mm×0.4 mm) of the samples prepared in the same manner as described later is heated from −20° C. to 250° C. at a heating rate of 2° C./min at a measurement frequency of 1 Hz, and a peak temperature of the resulting loss factor is obtained as a glass transition point.

[Crystallization Enthalpy of Polyamide Resin]

About 7.5 mg of a polyamide resin sample is weighed, and using a DSC apparatus (DSC8500, manufactured by Perkin-Elmer), a crystallization enthalpy is calculated from exothermic peaks accompanying crystallization when the resin, as prescribed in JIS K7122 (1999), is heated from 25° C. to 300° C. at a heating rate of 20° C./min, held in that state for 5 minutes, and thereafter cooled to 25° C. or lower at a rate of −20° C./min.

Examples 1 to 17 and Comparative Examples 1 to 14

Raw materials for polyamide resin compositions constituting a fan as listed in Tables 1 to 4 were melt-kneaded at 240° C. with an intermeshing co-rotating twin-screw extruder manufactured by The Japan Steel Works, Ltd., TEX-28V, and strand-cut, to provide pellets of the polyamide resin compositions. Here, the pellets obtained were subjected to dehumidification drying at 110° C. for 3 hours, to adjust its water content to 500 ppm or less.

The pellets obtained were injection-molded with an injection-molding machine manufactured by The Japan Steel Works, Ltd., J110AD-180H, cylinder temperatures set at 6 locations, of which cylinder temperature was set at 240° C. for the sections up to fifth units from the nozzle end side, at 170° C. for the remaining one unit, and at 45° C. for the section below the hopper, to mold into rectangular test pieces (63 mm×13 mm×6.4 mm), rectangular test pieces (125 mm×12 mm×6 mm), flat plate test pieces (127 mm×12.7 mm×1.2 mm), and flat plate test pieces (127 mm×12.7 mm×1.6 mm) at a mold temperature set to 80° C., to provide a molded article of the polyamide resin composition. In addition, with respect to Example 5, injection molding was carried out in the same manner with an injection-molding machine SE180D, manufactured by Sumitomo Heavy Industries Limited using a propeller shaped mold, to provide a propeller fan.

Examples 18 to 19 and Comparative Examples 15 to 17

Raw materials for polyamide resin compositions constituting a fan as listed in Table 5 were melt-kneaded at 280° C. with an intermeshing co-rotating twin-screw extruder manufactured by The Japan Steel Works, Ltd., TEX-28V, and strand-cut, to provide pellets of the polyamide resin compositions. Here, the pellets obtained were subjected to dehumidification drying at 110° C. for 3 hours, to adjust its water content to 500 ppm or less.

The pellets obtained were injection-molded with an injection-molding machine manufactured by The Japan Steel Works, Ltd., J110AD-180H, cylinder temperatures set at 6 locations, of which cylinder temperature was set at 275° C. for the sections up to fifth units from the nozzle end side, at 230° C. for the remaining one unit, and at 45° C. for the section below the hopper, to mold into rectangular test pieces (63 mm×13 mm×6.4 mm), rectangular test pieces (125 mm×12 mm×6 mm), flat plate test pieces (127 mm×12.7 mm×1.2 mm), and flat plate test pieces (127 mm×12.7 mm×1.6 mm) at a mold temperature set to 80° C., to provide a molded article of the polyamide resin composition.

Comparative Example 18

Raw materials constituting a fan as listed in Table 6 were injection-molded with the injection-molding machine. The cylinder temperature was set at 220° C. for the sections up to fifth units from the nozzle end side, at 170° C. for the remaining one unit, and at 45° C. for the section below the hopper. The injection molding was carried out with an injection-molding machine SE180D, manufactured by Sumitomo Heavy Industries Limited at a mold temperature set to 40° C. using a propeller shaped mold, to provide a propeller fan.

Here, the raw materials in Tables 1 to 8 are as follows.
[Polyamide Resin]
6 Nylon: Polycaproamide, AMILAN CM1017 manufactured by Toray Industries Inc., glass transition temperature: 50° C., crystallization enthalpy $\Delta Hmc$: 57 J/g
66 Nylon: Copolymer of hexamethylenediamine and adipic acid, AMILAN CM3001-N manufactured by Toray Industries Inc., glass transition temperature: 55° C., crystallization enthalpy $\Delta Hmc$: 59 J/g
[Thermoplastic General-Purpose Resin]
ABS: An acrylonitrile-butadiene-styrene copolymer resin, TOYOLAC 700-314 manufactured by Toray Industries, Inc., unreinforced
[Plasticizer]
Initial Condensed Product: ε-Caprolactam, UBE Caprolactam manufactured by UBE Industries, Inc.
BBSA: N-Butylbenzenesulfonamide, BM-4 manufactured by DAIHACHI CHEMICAL INDUSTRY CO., LTD.
POBO: 2-Ethylhexyl p-oxybenzoate manufactured by Tokyo Chemical Industry Co., Ltd.
HDPB: 2-Hexyldecyl p-oxybenzoate, EXCEPARL HDPB manufactured by KAO Corporation
[Filler]
Zinc Oxide: F-1 manufactured by HAKUSUI TECH, average particle size: 0.1 μm, aspect ratio: 1.2
Barium Sulfate, Granular: B-1 manufactured by Sakai Chemical Industry Co., Ltd., average particle size: 0.8 μm, aspect ratio: 1.6
Calcium Carbonate: NCC-A manufactured by NITTO FUNKA KOGYO K.K., average particle size: 2.2 μm, aspect ratio: 1.3
Aluminum Hydroxide: B703 manufactured by Nippon Light Metal Company, Ltd., average particle size: 3.5 μm, aspect ratio: 1.5
Talc: MICROACE P-6 manufactured by Nippon Talc Co., Ltd., length of the longest side of the largest surface: 4 μm, thickness of the largest surface: 0.13 μm, aspect ratio: 31, cross-sectional ratio of length to breadth: 5.6
Mica: A-21S manufactured by YAMAGUCHI MICA CO., LTD., length of the longest side of the largest surface: 23 μm, thickness of the largest surface: 0.33 μm, aspect ratio: 70, cross-sectional ratio of length to breadth: 13
Barium Sulfate, Plate-Like: B-54 manufactured by Sakai Chemical Industry Co., Ltd., length of the longest side of the largest surface: 1 μm, thickness of the largest surface: 0.17 μm, aspect ratio: 6, cross-sectional ratio of length to breadth: 4.1
Wollastonite: NYAD 325 manufactured by NYCO, particle length: 50 μm, particle size: 10 μm, aspect ratio: 5, cross-sectional ratio of length to breadth: 1.7
Glass Fibers: CSF 3PE-941 manufactured by Nittobo, average fiber length: 3 mm, average fiber diameter: 13 μm, aspect ratio: 231
[Organic Crystal Nucleating Agent]
Sodium Stearate: One manufactured by Wako Pure Chemical Industries, Ltd., average particle size: 7 μm
[Styrene-Isoprene Block Copolymer]
HYBRAR 5127 manufactured by Kuraray Plastics Co., Ltd., glass transition temperature: 8° C., styrene content: 20% by mass
[Styrene-Isoprene Block Copolymer, Hydrogenated]
S.O.E.L609 manufactured by ASAHI KASEI CHEMICALS, glass transition temperature: 10° C., styrene content: 67% by mass The properties of the molded articles obtained were evaluated in accordance with the methods of the following Test Examples 1 to 8. The results are shown in Tables 1 to 10.

Test Example 1—Izod Impact Resistance

As to rectangular test pieces having dimensions of 63 mm×13 mm×6.4 mm, to which a 13 mm notch was provided, an impact test was carried out with an Izod impact tester manufactured by YASUDA SEIKI SEISAKUSHO LTD. as prescribed in JIS K7110. It can be judged that the impact resistance is high when the Izod impact resistance is 40 J/m or more, and it can be judged that the higher the numerical value, the higher the effects.

Test Example 2—Flexural Modulus

As to rectangular test pieces having dimensions of 125 mm×12 mm×6 mm, as prescribed in JIS K7203, a flexural test was carried out with TENSILON manufactured by Orientec Co., LTD., TENSILON Tensile Tester RTC-1210A, with setting a crosshead speed to 3 min/min to obtain a flexural modulus. It can be judged that a flexural modulus is high, and an initial vibration is small when a flexural modulus is 1.7 GPa or more, and it can be judged that the higher the numerical value, the higher the effects.

Test Example 3—Loss Factor

As to flat test pieces having dimensions of 127 mm×12.7 mm×1.2 mm, as prescribed in JIS G0602, a test piece was fixed to a jig as shown in FIG. 1, and loss factor (at 23° C.) was obtained from free damped vibration waveform of flexural vibration by free-fixed impact vibration testing. Maximum Xn of response displacement was detected with a CCD Laser Displacement Sensor, LK-GD5000 manufactured by KEYENCE, and analyzed over time with an FFT Analyzer, Photon II manufactured by ARBROWN CO., LTD. The calculated zone of the response displacement was set at from 3.0 mm to 0.5 mm with an exception for the response displacement at an initial impact. It can be judged that the loss factor is high and the attenuation of vibrations is fast when the loss factor (at 23° C.) is preferably 0.04 or more, and more preferably 0.06 or more, and it can be judged that the higher the numerical value, the higher the effects.

Test Example 4—Fan Vibration Test

A propeller fan (PF150-5P-R, manufactured by Fantec, φ: 3.18) having a diameter of 150 mm, molded by injection molding was used. A system comprising Type 3160 as an oscillator, Type 2718 as an amplifier, Type 4810 as an excitation element, and Type 8001 as an accelerator sensor was used, all of the components being manufactured by B & K, and each of the instruments was controlled with a personal computer. A central portion of a molded article of the fan was attached to a contact chip, fixed to an accelerator sensor, random excitations were applied, and vibrations dB were calculated from a vibration speed detected at the accelerator sensor within a frequency range of from 20 Hz to 12,000 Hz. The measurement environment was temperature-controlled with a thermostat (PU-3J manufactured by ESPEC Corporation) to 23° C., 0° C., or 40° C., and vibrations dB at a resonance frequency of from 300 Hz to 500 Hz were obtained. It can be judged that the lower the numerical value, the more reduced the vibrations.

Test Example 5—Fan Noise Test

Figure 2:
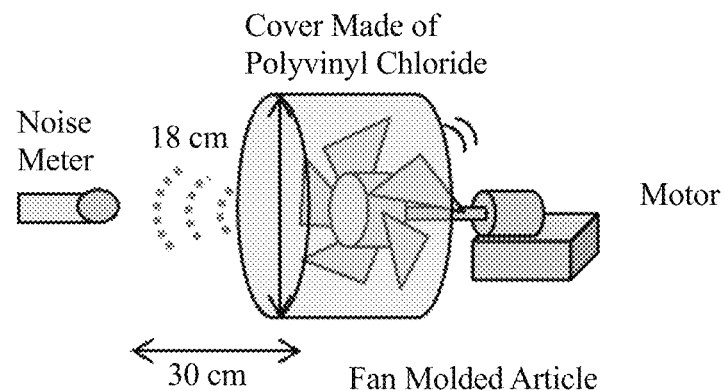
FIG. 2 is a view showing a jig used in the measurement of noises of a fan.

The same propeller fan molded article as above was used. The fan molded article was attached to a rotating shaft of a motor RS-540SH manufactured by Mabuchi Motor Co., Ltd., fixed as shown in FIG. 2, provided with a cover made of polyvinyl chloride attached with a felt as a sound absorbing material having a thickness of 7 mm in the surroundings, and rotated at each of the rotational speed. Noises generated when rotated at a rotational speed N (noise level: A dB) and the frequency corresponding to F=NZ/60 (Z=5) when rotated at the rotational speed N were plotted. The noise level was measured from a noise collecting instrument SL-1370 manufactured by CUSTOM Corporation, which was located 30 cm away from the fan. The noise level measurement was carried out in a quiet space at an environmental noise of 48 dB, and an average in 5 seconds was obtained. It can be judged that the lower the numerical value, the more reduced the noises.

Test Example 6—Loss Factor Temperature Dependence Test

As to flat test pieces having dimensions of 127 mm×12.7 mm×1.6 mm, the loss factor was calculated in accordance with half band width method from peaks of secondary resonance frequency of the frequency response function measured according to a central excitation method as prescribed in JIS K7391. A system comprising Type 3160 as an oscillator, Type 2718 as an amplifier, Type 4810 as an excitation element, and Type 8001 as an accelerator sensor, all of which are manufactured by B & K, and a loss factor measurement software MS18143 was used. The measurement environment was controlled with a thermostat PU-3J manufactured by ESPEC Corporation, and measurements were taken within the temperature ranges of from 0° C. to 80° C. It can be judged that if a loss factor at each temperature (0° C., 40° C.) is preferably 0.04 or more, the loss factor is high, so that the vibration-damping property is high.

Test Example 7—Fan Noise Test 2

Figure 5:
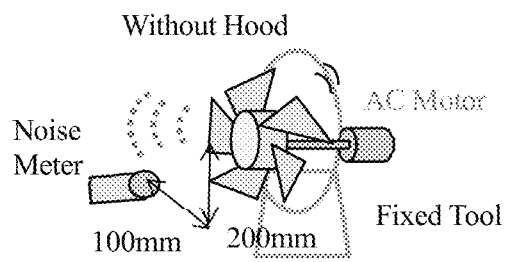
FIG. 5 is a view showing a jig used in the measurement of noises of a fan.

The same propeller fan molded article as above was used. The fan molded article was attached to a rotating shaft of a motor, AC motor manufactured by KUSATSU ELECTRIC CO., LTD., fixed as shown in FIG. 5, and rotated at each of the rotational speed. Noises generated at this time were collected with a noise collecting instrument 4189-A-029 manufactured by B & K at a position of 100 mm away from the width and 200 mm away from the bottom of the fan, and subjected to FFT analysis. The measurement time was 60 seconds, the average number of runs at one frequency was 358 points, and the properties of frequency-weightings were analyzed with A-weighting. The noise level measurement was carried out in a quiet space at an environmental noise of 40 dB. Among the FFT analyses of fan noises at each rotational speed, the frequency of the rotation noise peaks corresponding to F=2NZ/60 and the noise level were measured. Here, the material for the propeller fan molded article was a polyamide resin composition of Example 5 or a resin composition of Comparative Example 18. The results are shown in Table 9 and FIG. 6.

Test Example 8—Noise Test of Fan Structural Member

Figure 7:
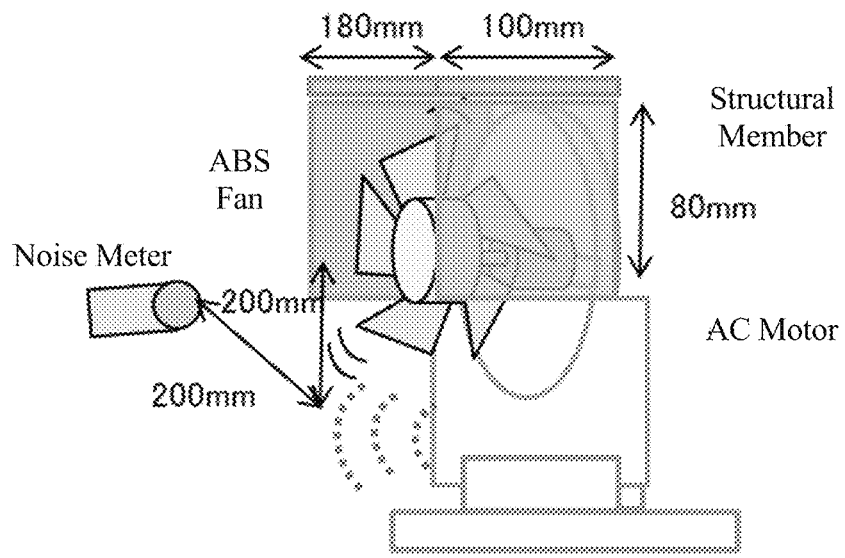
FIG. 7 is a view showing a jig used in the measurement of noises of a structural member of a fan.

The same propeller fan as above was used, except that the material was ABS. The fan was attached to a rotating shaft of a motor, AC motor manufactured by KUSATSU ELECTRIC CO., LTD., and fixed as shown in FIG. 7. As a structural member, using the materials of the above Example 5 and Comparative Example 18, a plate having a width of 180 mm, a length of 100 mm, a height of 80 mm, and a thickness of 20 mm were fixed thereto as a structural member of fan and used, respectively. Noises generated when rotated at each rotational speed (noise level: A dB) were measured from a noise collecting instrument SL-1370 manufactured by CUSTOM Corporation, which was located at a position 200 mm in a width direction and 200 mm below the fan. The noise level measurement was carried out in a quiet space at an environmental noise of 48 dB, and an average in 5 seconds was obtained. The fan noise levels at each rotational speed were measured. The results are shown in Table 10 and FIG. 8.

TABLE 1

|  |  |  | Examples |  |  |  |  |  |  |  |  |  |
|---|---|---|---|---|---|---|---|---|---|---|---|---|
|  |  |  | 1 | 2 | 3 | 4 | 5 | 6 | 7 | 8 | 9 | 10 |
| Polyamide Resin |  | 6 Nylon | 100 | 100 | 100 | 100 | 100 | 100 | 100 | 100 | 100 | 100 |
| Plasticizer |  | Initial Condensate | — | — | — | — | — | — | — | — | — | — |
|  |  | BBSA | 15 | 15 | 15 | 15 | 15 | 15 | 15 | 10 | 20 | 30 |
|  |  | POBO | — | — | — | — | — | — | — | — | — | — |
|  |  | HDPB | — | — | — | — | — | — | — | — | — | — |
| Fillers | Granular Filler | Zinc Oxide | — | — | — | — | — | — | — | — | — | — |
|  |  | Barium Sulfate, | — | — | — | — | — | — | — | — | — | — |

TABLE 1-continued

|  |  |  | Examples |  |  |  |  |  |  |  |  |  |
|---|---|---|---|---|---|---|---|---|---|---|---|---|
|  |  |  | 1 | 2 | 3 | 4 | 5 | 6 | 7 | 8 | 9 | 10 |
|  |  | Granular Calcium Carbonate | — | — | — | — | — | — | — | — | — | — |
|  |  | Aluminum Hydroxide | — | — | — | — | — | — | — | — | — | — |
|  | Plate-Like Filler | Talc | 20 | 40 | 60 | 80 | — | — | — | 40 | 40 | 40 |
|  |  | Mica | — | — | — | — | 40 | — | — | — | — | — |
|  |  | Barium Sulfate, Plate-Like | — | — | — | — | — | 40 | — | — | — | — |
|  | Acicular Filler | Wollastonite | — | — | — | — | — | — | 40 | — | — | — |
|  | Fibrous Filler | Glass Fibers | — | — | — | — | — | — | — | — | — | — |
| Organic Crystal Nucleating Agent | | Sodium Stearate | — | — | — | — | — | — | — | — | — | — |
| Content of Polyamide Resin in Resin Composition, % by mass | | | 74.1 | 64.5 | 57.1 | 51.3 | 64.5 | 64.5 | 64.5 | 66.7 | 62.5 | 58.8 |
| Properties | Toughness | Izod Impact Resistance, J/m | 77 | 66 | 55 | 50 | 59 | 70 | 68 | 60 | 72 | 80 |
|  | Rigidity | Flexural Modulus, GPa | 2.0 | 2.8 | 4.1 | 4.4 | 3.8 | 2.2 | 2.3 | 3.1 | 2.6 | 2.4 |
|  | Vibration-Damping Property | Loss Factor | 0.110 | 0.110 | 0.097 | 0.090 | 0.090 | 0.088 | 0.086 | 0.095 | 0.115 | 0.120 |

\* The amounts of the raw materials used are expressed by parts by mass.

TABLE 2

|  |  |  | Examples |  |  |  |  |  |  |  |
|---|---|---|---|---|---|---|---|---|---|---|
|  |  |  | 11 | 12 | 13 | 14 | 15 | 16 | 17 | 20 |
| Polyamide Resin | | 6 Nylon | 100 | 100 | 100 | 100 | 100 | 100 | 100 | 100 |
| Plasticizer | | Initial Condensate | — | — | — | — | — | — | — | — |
|  | | BBSA | 15 | 15 | 15 | — | — | 15 | 15 | 15 |
|  | | POBO | — | — | — | 15 | — | — | — | — |
|  | | HDPB | — | — | — | — | 15 | — | — | — |
| Fillers | Granular Filler | Aluminum Hydroxide | — | — | — | — | — | — | — | — |
|  | Plate-Like Filler | Talc | 40 | 40 | 40 | 40 | 40 | 40 | 40 | 40 |
|  |  | Mica | — | — | — | — | — | — | — | — |
|  |  | Barium Sulfate, Plate-Like | — | — | — | — | — | — | — | — |
|  | Acicular Filler | Wollastonite | — | — | — | — | — | — | — | — |
|  | Fibrous Filler | Glass Fibers | — | 10 | 5 | 5 | 5 | — | — | — |
| Organic Crystal Nucleating Agent | | Sodium Stearate | — | — | — | — | — | 1 | — | — |
| Styrene-Isoprene Block Copolymer | | HYBRAR 5127 | — | — | — | — | — | — | 15 | — |
| Styrene-Butadiene Block Copolymer, Hydrogenated | | S.O.E L609 | — | — | — | — | — | — | — | 15 |
| Content of Polyamide Resin in Resin Composition, % by mass | | | 62.5 | 60.6 | 62.5 | 62.5 | 62.5 | 64.1 | 58.8 | 58.8 |
| Properties | Toughness | Izod Impact Resistance, J/m | 65 | 42 | 60 | 57 | 59 | 70 | 41 | 58 |
|  | Rigidity | Flexural Modulus, GPa | 2.9 | 4.2 | 3.2 | 3.5 | 3.7 | 3.1 | 2.5 | 2.5 |
|  | Vibration-Damping Property | Loss Factor | 0.101 | 0.078 | 0.103 | 0.095 | 0.092 | 0.120 | 0.115 | 0.113 |

\* The amounts of the raw materials used are expressed by parts by mass.

TABLE 3

|  |  |  | Comparative Examples |  |  |  |  |  |  |  |
|---|---|---|---|---|---|---|---|---|---|---|
|  |  |  | 1 | 2 | 3 | 4 | 5 | 6 | 7 | 8 |
| Polyamide Resin | | 6 Nylon | 100 | 100 | 100 | 100 | 100 | 100 | 100 | 100 |
| Plasticizer | | Initial Condensate | — | — | — | — | — | — | — | — |
|  | | BBSA | — | 15 | 5 | 40 | 15 | 15 | 15 | 15 |
|  | | POBO | — | — | — | — | — | — | — | — |
|  | | HDPB | — | — | — | — | — | — | — | — |

TABLE 3-continued

| | | | Comparative Examples | | | | | | | |
|---|---|---|---|---|---|---|---|---|---|---|
| | | | 1 | 2 | 3 | 4 | 5 | 6 | 7 | 8 |
| Fillers | Granular Filler | Zinc Oxide | — | — | — | — | — | — | — | — |
| | | Barium Sulfate, Granular | — | — | — | — | — | — | — | — |
| | | Calcium Carbonate | — | — | — | — | — | — | — | — |
| | | Aluminum Hydroxide | — | — | — | — | — | — | — | — |
| | Plate-Like Filler | Talc | — | — | 40 | 40 | 10 | 90 | — | — |
| | | Mica | — | — | — | — | — | — | — | — |
| | | Barium Sulfate, Plate-Like | — | — | — | — | — | — | — | — |
| | Acicular Filler | Wollastonite | — | — | — | — | — | — | — | — |
| | Fibrous Filler | Glass Fibers | — | — | — | — | — | — | 40 | 45 |
| Organic Crystal Nucleating Agent | | Sodium Stearate | — | — | — | — | — | — | — | — |
| Content of Polyamide Resin in Resin Composition, % by mass | | | 100.0 | 87.0 | 69.0 | 55.6 | 80.0 | 48.8 | 64.5 | 62.5 |
| Properties | Toughness | Izod Impact Resistance, J/m | 19 | 160 | 40 | Undeterminable | 85 | 31 | 38 | 36 |
| | Rigidity | Flexural Modulus, GPa | 2.1 | 1.0 | 3.5 | | 1.3 | 4.5 | 2.3 | 2.5 |
| | Vibration-Damping Property | Loss Factor | 0.019 | 0.124 | 0.031 | | 0.115 | 0.065 | 0.070 | 0.065 |

* The amounts of the raw materials used are expressed by parts by mass.

TABLE 4

| | | | Comparative Examples | | | | | |
|---|---|---|---|---|---|---|---|---|
| | | | 9 | 10 | 11 | 12 | 13 | 14 |
| Polyamide Resin | | 6 Nylon | 100 | 100 | 100 | 100 | 100 | 100 |
| Plasticizer | | Initial Condensate | — | — | — | — | 10 | 10 |
| | | BBSA | 15 | 15 | 15 | 15 | — | — |
| | | POBO | — | — | — | — | — | — |
| | | HDPB | — | — | — | — | — | — |
| Fillers | Granular Filler | Zinc Oxide | 40 | — | — | — | 110 | 60 |
| | | Barium Sulfate, Granular | — | 40 | — | — | — | — |
| | | Calcium Carbonate | — | — | 40 | — | — | — |
| | | Aluminum Hydroxide | — | — | — | 40 | — | — |
| | Plate-Like Filler | Talc | — | — | — | — | — | — |
| | | Mica | — | — | — | — | — | — |
| | | Barium Sulfate, Plate-Like | — | — | — | — | — | — |
| | Acicular Filler | Wollastonite | — | — | — | — | — | — |
| | Fibrous Filler | Glass Fibers | — | — | — | — | 50 | 50 |
| Organic Crystal Nucleating Agent | | Sodium Stearate | — | — | — | — | — | — |
| Content of Polyamide Resin in Resin Composition, % by mass | | | 64.5 | 64.5 | 64.5 | 64.5 | 37.0 | 45.5 |
| Properties | Toughness | Izod Impact Resistance, J/m | 81 | 78 | 80 | 75 | 30 | 33 |
| | Rigidity | Flexural Modulus, GPa | 1.3 | 1.4 | 1.3 | 1.5 | 10.0 | 8.2 |
| | Vibration-Damping Property | Loss Factor | 0.080 | 0.078 | 0.080 | 0.075 | 0.039 | 0.045 |

* The amounts of the raw materials used are expressed by parts by mass.

TABLE 5

| | | Examples | | Comparative Examples | | |
|---|---|---|---|---|---|---|
| | | 18 | 19 | 15 | 16 | 17 |
| Polyamide Resin | 66 Nylon | 100 | 100 | 100 | 100 | 100 |
| Plasticizer | Initial Condensate | — | — | — | — | — |
| | BBSA | 20 | 15 | — | — | 15 |

TABLE 5-continued

|  |  |  | Examples | | Comparative Examples | | |
|---|---|---|---|---|---|---|---|
|  |  |  | 18 | 19 | 15 | 16 | 17 |
| Fillers | Granular Filler | POBO | — | — | — | — | — |
|  |  | HDPB | — | — | — | — | — |
|  |  | Zinc Oxide | — | — | — | — | — |
|  |  | Barium Sulfate, Granular | — | — | — | — | — |
|  |  | Calcium Carbonate | — | — | — | — | — |
|  |  | Aluminum Hydroxide | — | — | — | — | — |
|  | Plate-Like Filler | Talc | 40 | 40 | — | 40 | — |
|  |  | Mica | — | — | — | — | — |
|  |  | Barium Sulfate, Plate-Like | — | — | — | — | — |
|  | Acicular Filler | Wollastonite | — | — | — | — | — |
|  | Fibrous Filler | Glass Fibers | — | — | — | — | — |
| Organic Crystal Nucleating Agent | | Sodium Stearate | — | — | — | — | — |
| Styrene-Isoprene Block Copolymer | | HYBRAR 5127 | — | 15 | — | — | — |
| Content of Polyamide Resin in Resin Composition, % by mass | | | 62.5 | 58.8 | 100 | 71.4 | 87.0 |
| Properties | Toughness | Izod Impact Resistance, J/m | 55 | 40 | 39 | 45 | 70 |
|  | Rigidity | Flexural Modulus, GPa | 3.5 | 3.0 | 2.8 | 4.5 | 1.6 |
|  | Vibration-Damping Property | Loss Factor | 0.085 | 0.092 | 0.015 | 0.008 | 0.090 |

\* The amounts of the raw materials used are expressed by parts by mass.

TABLE 6

Vibrations, Vibration Noises of Fan at Room Temperature

|  |  | Example 5 | Comparative Example 18 |
|---|---|---|---|
| Resin | 6 Nylon | 100 | — |
|  | ABS | — | 100 |
| Plasticizer | BBSA | 15 | — |
| Inorganic Filler | Mica | 40 | — |
| Mass Ratio of Plasticizer to Inorganic Filler, Plasticizer/Inorganic Filler | | 27/73 | — |
| Vibration Test, at 23° C. | Resonance Frequency, Hz | 482 | 372 |
|  | Vibrations dB | −29 | −10 |
| Noise Test, at 23° C. | Frequency, Hz | 334 | 334 |
|  | Noise Level | 87 | 88 |
| Noise Test, at 23° C. | Frequency, Hz | 372 | 372 |
|  | Noise Level | 89 | 91 |
| Noise Test, at 23° C. | Frequency, Hz | 482 | 482 |
|  | Noise Level | 94 | 97 |

TABLE 7

Vibrations of Fan at Low Temperature and High Temperature

|  |  | Example 5 | Comparative Example 18 |
|---|---|---|---|
| Resin | 6 Nylon | 100 | — |
|  | ABS | — | 100 |
| Plasticizer | BBSA | 15 | — |
| Inorganic Filler | Mica | 40 | — |
| Mass Ratio of Plasticizer to Inorganic Filler, Plasticizer/Inorganic Filler | | 27/73 | — |
| Vibration Test, at 23° C. | Resonance Frequency, Hz | 482 | 372 |
|  | Vibrations dB | −29 | −10 |
| Vibration Test, at 0° C. | Resonance Frequency, Hz | 560 | 384 |
|  | Vibrations dB | −23 | −8 |
| Vibration Test, at 40° C. | Resonance Frequency, Hz | 416 | 370 |
|  | Vibrations dB | −31 | −9 |

TABLE 8

Loss Factor at Low Temperature and High Temperature

|  |  | Examples | | | |
|---|---|---|---|---|---|
|  |  | 2 | 16 | 17 | 20 |
| Resin | 6 Nylon | 100 | 100 | 100 | 100 |
| Plasticizer | BBSA | 15 | 15 | 15 | 15 |
| Inorganic Filler | Talc | 40 | 40 | 40 | 40 |
| Organic Crystal Nucleating Agent | Sodium Stearate | — | 1 | — | — |
| Elastomer | Styrene-Isoprene Block Copolymer | — | — | 15 | — |
|  | Styrene-Butadiene Block Copolymer, Hydrogenated | — | — | — | 15 |
| Mass Ratio of Plasticizer to Inorganic Filler, Plasticizer/Inorganic Filler | | 27/73 | 27/73 | 27/73 | 27/73 |
| Vibration-Damping Property | Loss Factor, at 23° C. *1 | 0.110 | 0.120 | 0.115 | 0.113 |

TABLE 8-continued

Loss Factor at Low Temperature and High Temperature

|  |  | Examples | | | |
|---|---|---|---|---|---|
|  |  | 2 | 16 | 17 | 20 |
| Vibration-Damping Property | Loss Factor, at 0° C. *2 | 0.042 | 0.055 | 0.050 | 0.060 |
| Vibration-Damping Property | Loss Factor, at 40° C. *2 | 0.105 | 0.122 | 0.120 | 0.110 |

*1: Measured according to the method of Test Example 3.
*2: Measured according to the method of Test Example 6.

TABLE 9

| Example 5 | | | Comparative Example 18 | | |
|---|---|---|---|---|---|
| Setting of Rotational Speed, rpm | Frequency, Hz, of Rotation Noise Peaks of F = 2NZ/60 | Noise Level, dB, of Rotation Noise Peaks of F = 2NZ/60 | Setting of Rotational Speed, rpm | Frequency, Hz, of Rotation Noise Peaks of F = 2NZ/60 | Noise Level, dB, of Rotation Noise Peaks of F = 2NZ/60 |
| 1,900 | 308 | 34 | 1,900 | 316 | 33 |
| 1,950 | 324 | 34 | 1,950 | 328 | 36 |
| 2,000 | 336 | 37 | 2,000 | 336 | 42 |
| 2,030 | 338 | 38 | 2,030 | 332 | 43 |
| 2,050 | 342 | 39 | 2,050 | 340 | 41 |
| 2,100 | 348 | 41 | 2,100 | 348 | 38 |
| 2,200 | 362 | 40 | 2,200 | 372 | 39 |
| 2,250 | 374 | 40 | 2,250 | 372 | 40 |
| 2,300 | 384 | 42 | 2,300 | 384 | 43 |

TABLE 10

| Example 5 | | Comparative Example 18 | |
|---|---|---|---|
| Setting of Rotational Speed, rpm | Noise Level, dB | Setting of Rotational Speed, rpm | Noise Level, dB |
| 300 | 50 | 300 | 50 |
| 350 | 52 | 350 | 52 |
| 400 | 55 | 400 | 60 |
| 450 | 59 | 450 | 64 |
| 500 | 62 | 500 | 64 |
| 550 | 63 | 550 | 64 |
| 600 | 65 | 600 | 66 |
| 650 | 67 | 650 | 68 |
| 700 | 70 | 700 | 70 |

As a result, as shown in Tables 1 to 5, Examples 1 to 20 had high effects in all of impact resistance, flexural modulus, and loss factor, as compared to those of Comparative Examples 1 to 17. In particular, it can be seen from the comparisons of Example 2 with Comparative Examples 7 and 8, since an inorganic filler is a plate-like filler, toughness is remarkably improved, in addition to rigidity and vibration-damping property. It can be seen from the above that all of toughness, rigidity, and vibration-damping property can be improved by blending particular amounts of a plasticizer and a plate-like filler and/or an acicular filler to various polyamide resins, thereby suggesting applications to varieties of uses. In addition, it can be seen from the comparisons of Examples 2, 5, and 6 that talc is preferred among the plate-like fillers, from the viewpoint of even more improving loss factor.

Figure 3:
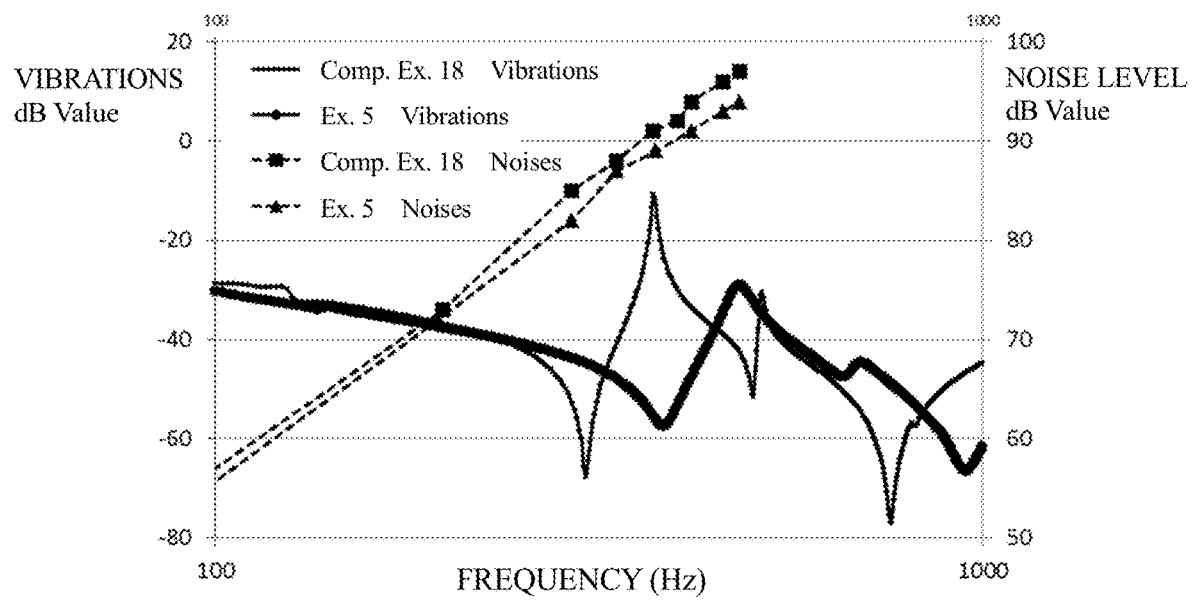
FIG. 3 is a graph showing the results of vibration tests and noise tests of a fan.
Figure 4:
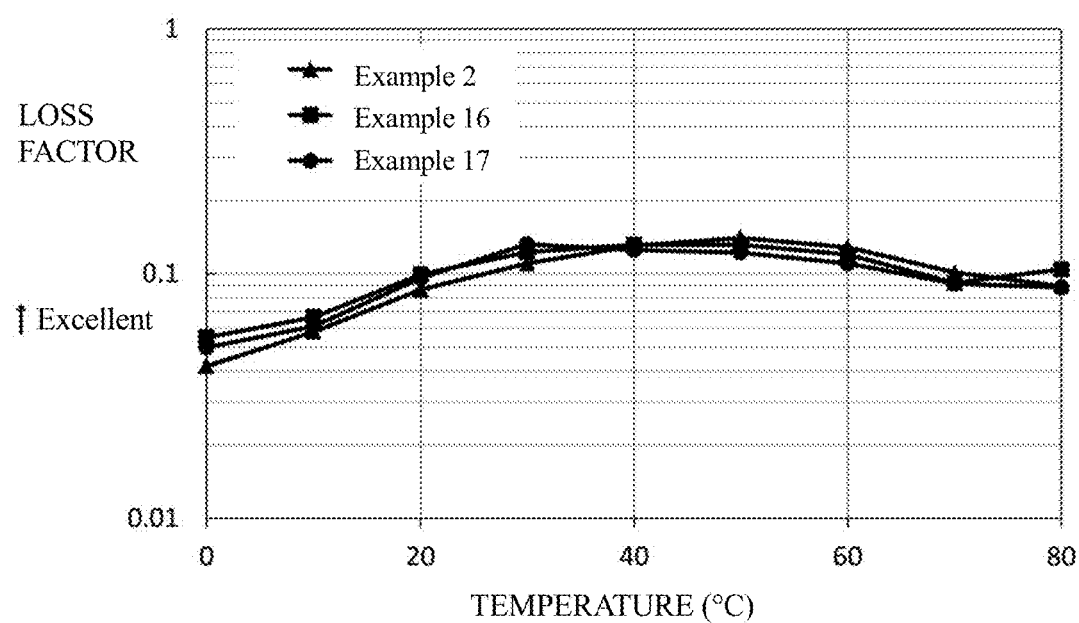
FIG. 4 is a graph showing the results of temperature dependency tests of loss factor for a resin composition constituting a fan.

In addition, as shown in Tables 6 and 7 and FIG. 3, it can be seen that Example 5 has smaller vibrations or noise even at the same frequency as compared to Comparative Example 18, and exhibits sufficient vibration-damping functions not only in a room-temperature region but also in the low-temperature region and the high-temperature region. Also, as shown in Table 8 and FIG. 4, the fan of the present invention shows even more excellent vibration-damping property in room temperature region while showing excellent vibration-damping property over a wide temperature range by including an organic crystal nucleating agent or an elastomer.

Figure 6:
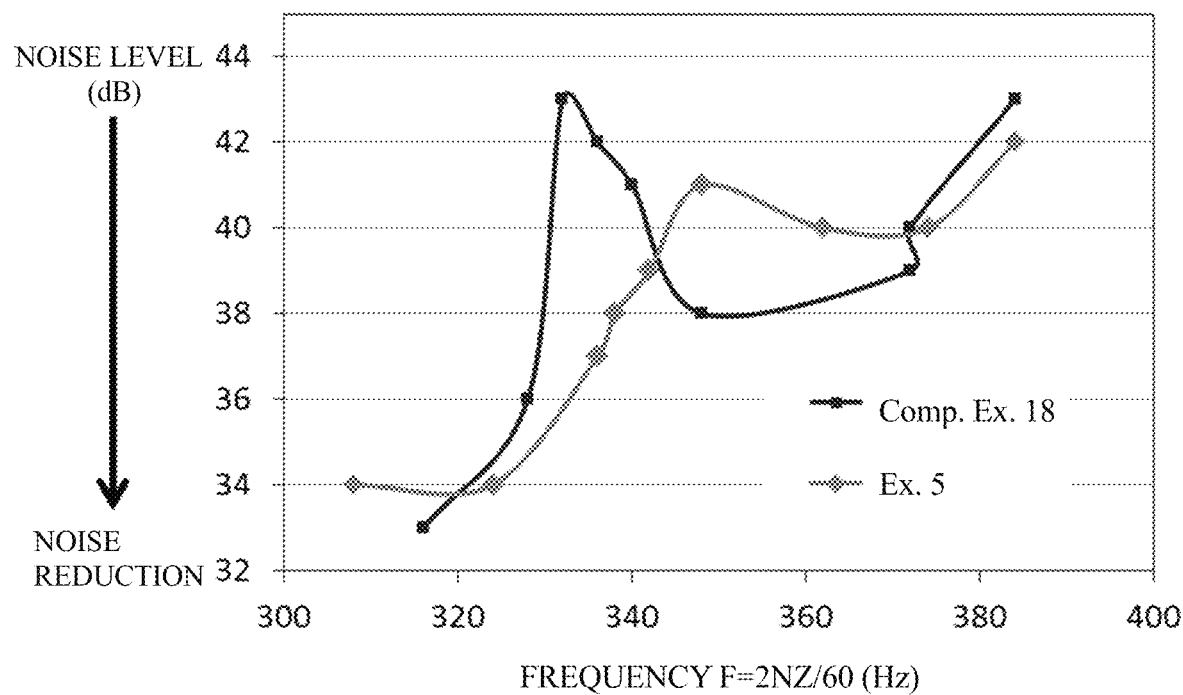
FIG. 6 is a graph showing the relationships between frequency and noises of a fan.

It can be seen from Table 9 and FIG. 6 (the graph summarizing the relationship of frequency and noise based on Table 9) that the noises are reduced by the fan of the present invention under the conditions at which the vicinity of the resonance frequency obtained according to a vibration test in Table 6 of Test Example 5 and the frequency of the rotation noise peaks corresponding to F=2NZ/60 overlap, specifically, in the vicinity of a resonance frequency in Example 5 or Comparative Example 18. Although a propeller fan of the same material as in Test Example 5 was used in Test Example 7, a molded article in the state that propeller fan sufficiently absorbed water was used in Test Example 7. Therefore, it is considered that the physical properties changed by the water absorption rate, so that the resonance frequency changed from that shown in Table 6 of Test Example 5.

Figure 8:
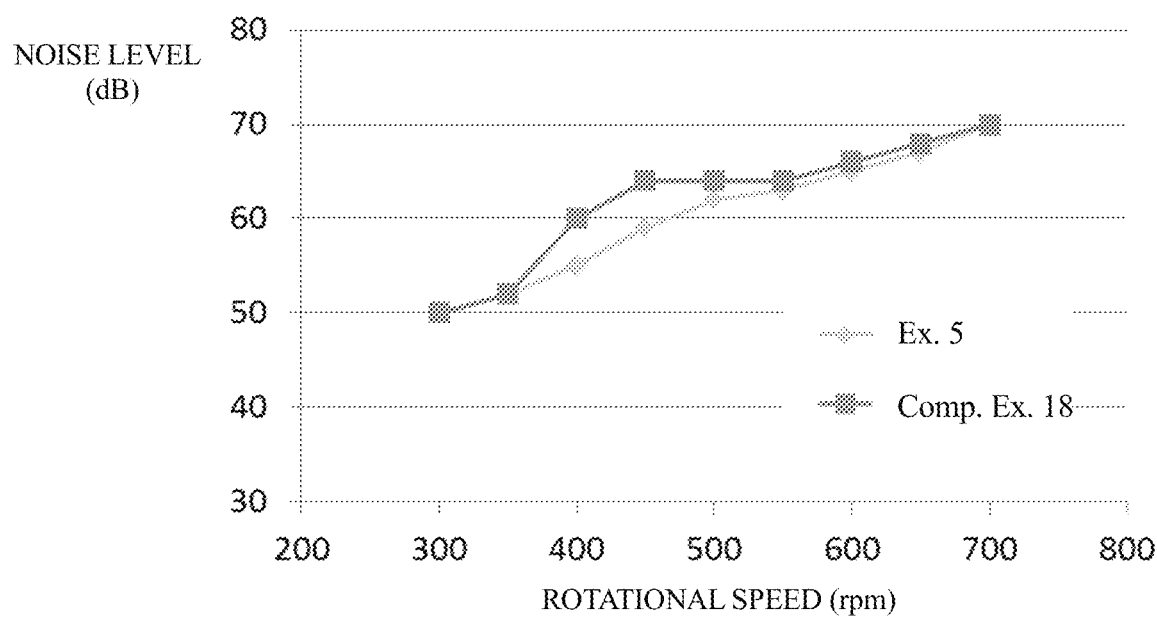
FIG. 8 is a graph showing the relationships between the rotational speed and noise level of a fan.

It can be seen from Table 10 and FIG. 8 (the graph summarizing the relationship of the rotational speed and noise level based on Table 10) that the noise levels measured under the conditions of the rotational speed of from 400 to 550 are reduced by using a polyamide resin composition in the present invention as a material of a structural member of the fan, not the blades of the fan.

INDUSTRIAL APPLICABILITY

The fan of the present invention can be suitably used in, for example, manufactured articles, such as audio equipment such as speakers, television, radio cassette recorders, headphones, audio components, or microphones, electric appliances, transportation vehicles, construction buildings, and industrial equipment, or parts thereof.

The invention claimed is:

1. A fan comprising a polyamide resin composition comprising:
   a polyamide resin,
   a plasticizer in an amount of 7 parts by mass or more and 35 parts by mass or less, and
   one or more components selected from the group consisting of plate-like fillers and acicular fillers in an amount of 15 parts by mass or more and 80 parts by mass or less,
   based on 100 parts by mass of the polyamide resin.

2. The fan according to claim 1, wherein the polyamide resin is one or more members selected from the group consisting of the following (1) to (3):
   (1) a copolymer of a polycondensate of a diamine and a dicarboxylic acid;
   (2) a polymer of a polycondensate of a lactam or an aminocarboxylic acid; and
   (3) a polymer containing two or more members selected from the group consisting of (1) and (2).

3. The fan according to claim 1, wherein the polyamide resin is one or more members selected from the group consisting of Polyamide 6 and Polyamide 66.

4. The fan according to claim 1, wherein the plasticizer comprises one or more members selected from the group consisting of amide-based plasticizers, ester-based plasticizers, and amide ester-based plasticizers.

5. The fan according to claim 4, wherein a content of one or more members selected from the group consisting of amide-based plasticizers, ester-based plasticizers, and amide ester-based plasticizers is 50% by mass or more of the plasticizer.

6. The fan according to claim 1, wherein a content of the plasticizer in the polyamide resin composition is 8% by mass or more and 30% by mass or less.

7. The fan according to claim 1, further comprising a fibrous filler.

8. The fan according to claim 7, wherein a content of the fibrous filler is 3% by mass or more and 30% by mass or less of a total content of filler.

9. The fan according to claim 1, wherein a content of one or more components selected from the group consisting of plate-like fillers and acicular fillers is 15 parts by mass or more and 40 parts by mass or less.

10. The fan according to claim 1, wherein the one or more components selected from the group consisting of plate-like fillers and acicular fillers is selected from talc or mica.

11. The fan according to claim 1, wherein a content of the one or more components selected from the group consisting of plate-like fillers and acicular fillers is 50% by mass or more of a total content of filler.

12. The fan according to claim 7, wherein a mass ratio of one or more components selected from the group consisting of plate-like fillers and acicular fillers to the fibrous filler [(plate-like filler+acicular filler)/fibrous filler] is from 70/30 to 95/5.

13. The fan according to claim 1, wherein a total content of the fillers used, based on 100 parts by mass of the polyamide resin, is 20 parts by mass or more and 55 parts by mass or less.

14. The fan according to claim 1, wherein a total content of the fillers used in the polyamide resin composition is 10% by mass or more, and 45% by mass or less.

15. The fan according to claim 1, wherein a mass ratio of the plasticizer to one or more components selected from the group consisting of plate-like fillers and acicular fillers [plasticizer/(plate-like filler+acicular filler)] is from 0.15 to 0.8.

16. The fan according to claim 1, further comprising an organic crystal nucleating agent.

17. The fan according to claim 16, wherein a content of the organic crystal nucleating agent is 0.01 parts by mass or more and 30 parts by mass or less, based on 100 parts by mass of the polyamide resin.

18. The fan according to claim 1, wherein a fan blade, fan cover, fan casing, motor cover, duct, baffle plate, bell mouth, or hood comprises said polyamide resin composition.

19. A method for reducing vibration noise from a fan, said method comprising the step of forming a fan blade, fan cover, fan casing, motor cover, duct, baffle plate, bell mouth, or hood of said fan comprising a polyamide resin composition defined in claim 1.

* * * * *